United States Patent
Chang et al.

(10) Patent No.: US 8,355,464 B2
(45) Date of Patent: Jan. 15, 2013

(54) METHOD FOR GENERATING AND TRANSMITTING DOWNLINK FRAME

(75) Inventors: Kap-Seok Chang, Daejeon (KR); Il-Gyu Kim, Seoul (KR); Hyeong-Geun Park, Daejeon (KR); Young-Jo Ko, Daejeon (KR); Hyo-Seok Yi, Daejeon (KR); Young-Hoon Kim, Daejeon (KR); Seung-Chan Bang, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 912 days.

(21) Appl. No.: 12/515,356

(22) PCT Filed: Nov. 16, 2007

(86) PCT No.: PCT/KR2007/005793
§ 371 (c)(1),
(2), (4) Date: May 18, 2009

(87) PCT Pub. No.: WO2008/060123
PCT Pub. Date: May 22, 2008

(65) Prior Publication Data
US 2010/0034301 A1 Feb. 11, 2010

(30) Foreign Application Priority Data
Nov. 16, 2006 (KR) .......................... 10-2006-0113455

(51) Int. Cl.
*H04L 27/00* (2006.01)
(52) U.S. Cl. ........ 375/299; 375/146; 375/267; 375/354; 370/509
(58) Field of Classification Search .................. 375/141, 375/146, 260, 267, 285, 295, 299, 219, 220, 375/354; 370/503, 509–514
See application file for complete search history.

(56) References Cited

U.S. PATENT DOCUMENTS
| 8,194,594 B2 * | 6/2012 | Chang et al. ................. 370/328 |
| 2008/0032744 A1 * | 2/2008 | Khan et al. ................ 455/562.1 |

(Continued)

FOREIGN PATENT DOCUMENTS
WO   WO-2004/038987 A2   5/2004
(Continued)

OTHER PUBLICATIONS

Chang, Kapseok et al., "Open-loop Transmit Diversity for Broadcast Channel Transmission in E-UTRA," *IEEE 66th Vehicular Technology Conference*, pp. 1293-1297 (2007).
Riga, Latvia, "Downlink Transmit Diversity Schemes for BCH Transmission," retrieved online at http://www.quintillion.co.jp/3GPP/TSG_RAN/TSG_RAN2006/TSG_RAN_WG1_RL1_11.html (2006).

(Continued)

*Primary Examiner* — Dac Ha
(74) *Attorney, Agent, or Firm* — Nelson Mullins Riley & Scarborough LLP; EuiHoon Lee, Esq.

(57) ABSTRACT

A downlink frame generation device arrange a plurality of synchronization channel symbols and a plurality of broadcasting channel symbols in a common bandwidth of a system so that the symbols may neighbor each other on the time axis. The downlink frame generation device applies a precoding vector to the synchronization channel symbols and the broadcasting channel symbols to generate a plurality of downlink frames corresponding to a plurality of antennas. The precoding vector is variable by a sector for transmitting a plurality of downlink frames and a subframe in which a plurality of synchronization channel symbols are positioned. The precoding vector is independent of an index of a subcarrier.

9 Claims, 23 Drawing Sheets

U.S. PATENT DOCUMENTS

| | | | | |
|---|---|---|---|---|
| 2008/0285670 | A1* | 11/2008 | Walton et al. | 375/260 |
| 2010/0035627 | A1* | 2/2010 | Hou et al. | 455/452.2 |
| 2011/0019770 | A1* | 1/2011 | Gorokhov et al. | 375/296 |

FOREIGN PATENT DOCUMENTS

| | | | |
|---|---|---|---|
| WO | WO-2004/039027 | A2 | 5/2004 |
| WO | WO-2007/073116 | A1 | 6/2007 |

OTHER PUBLICATIONS

Tanno, Motohiro et al., "Physical Channel Structures and Cell Search Method for Scalable Bandwidth for OFDM Radio Access in Evolved UTRA Downlink," *IEEE Wireless Communications and Networking Conference*, pp. 1506-1511 (2007).

\* cited by examiner

【FIG. 1】
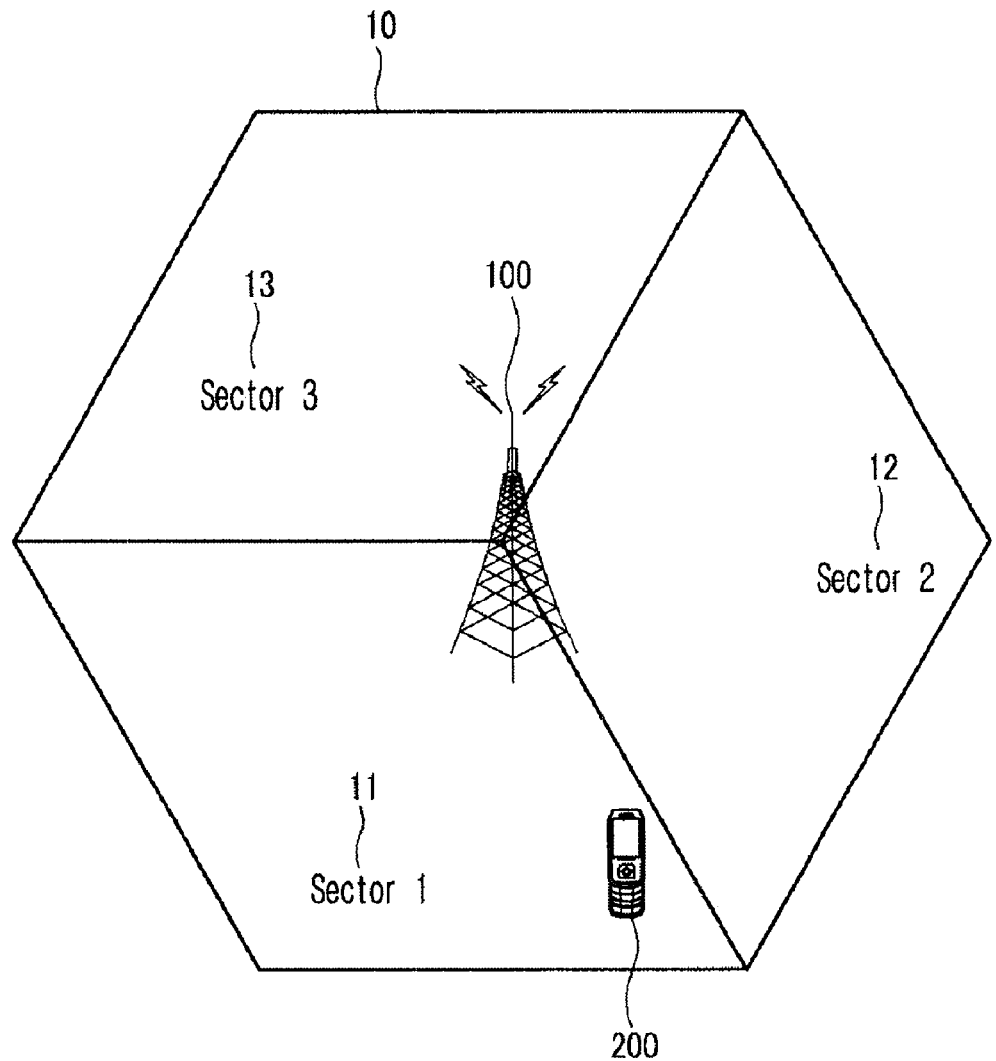
【FIG. 2】
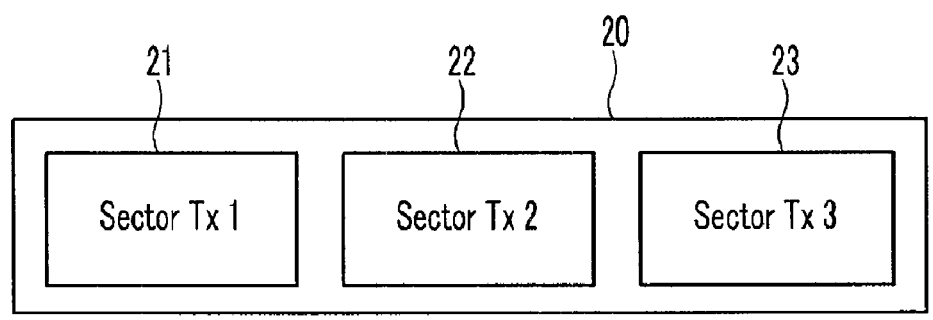

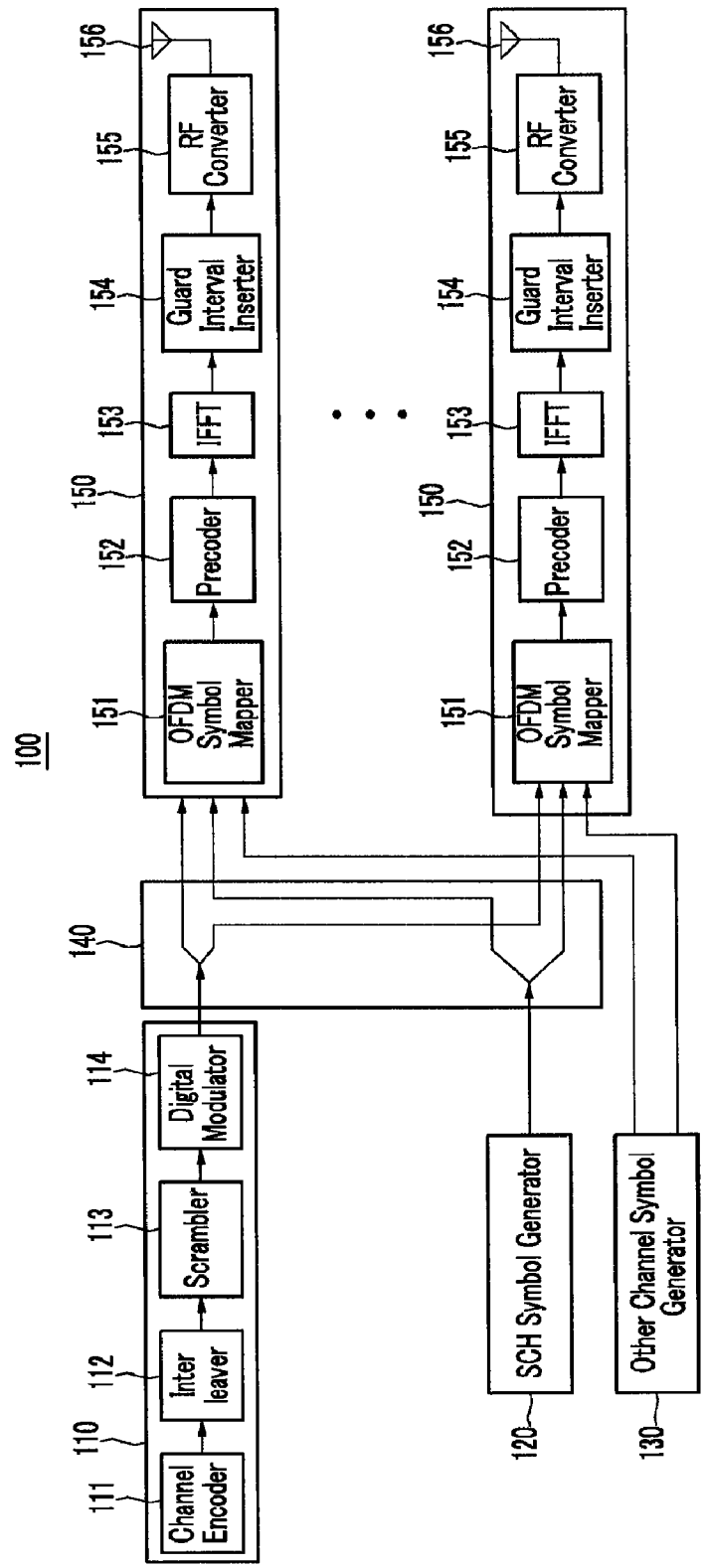
[FIG. 3]

[FIG. 4]
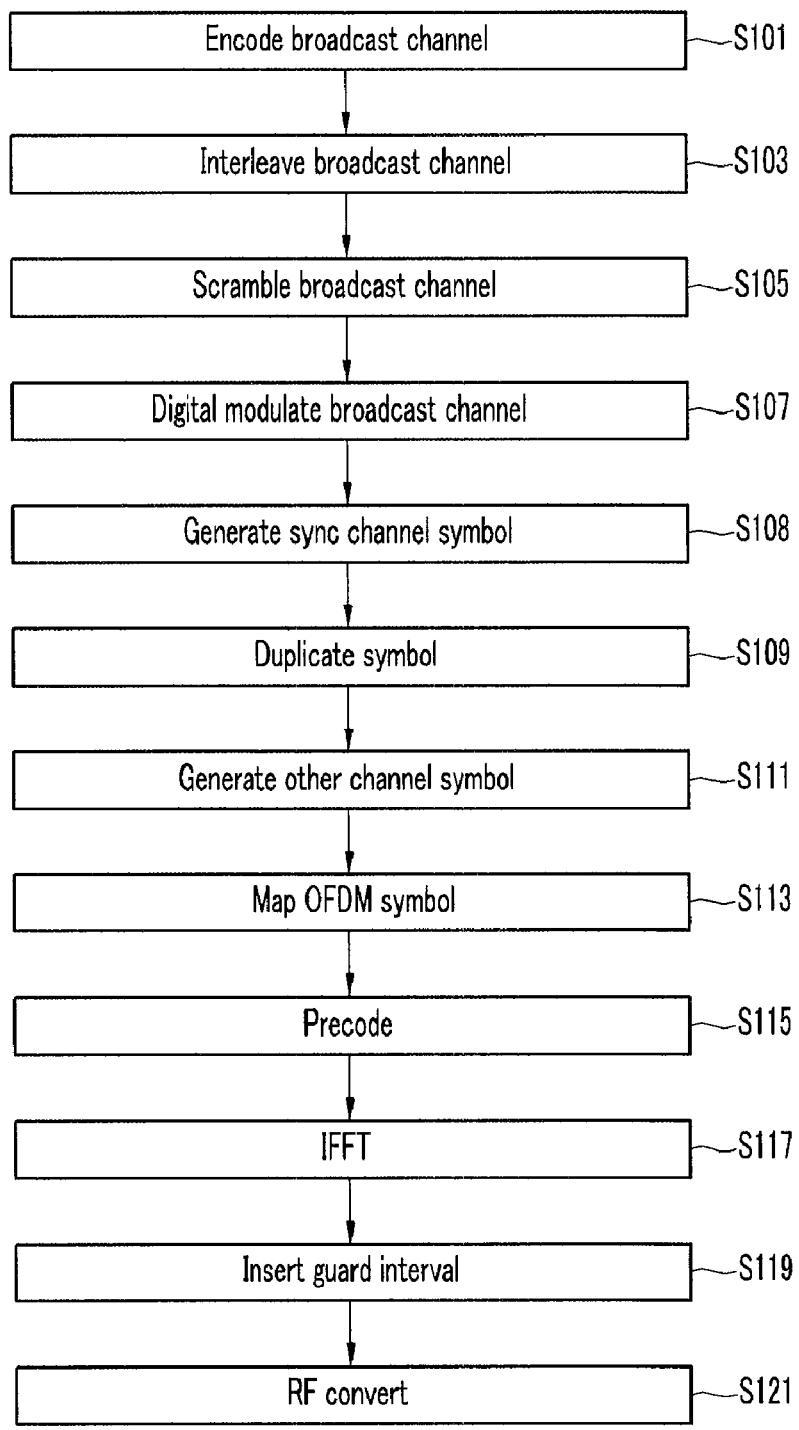

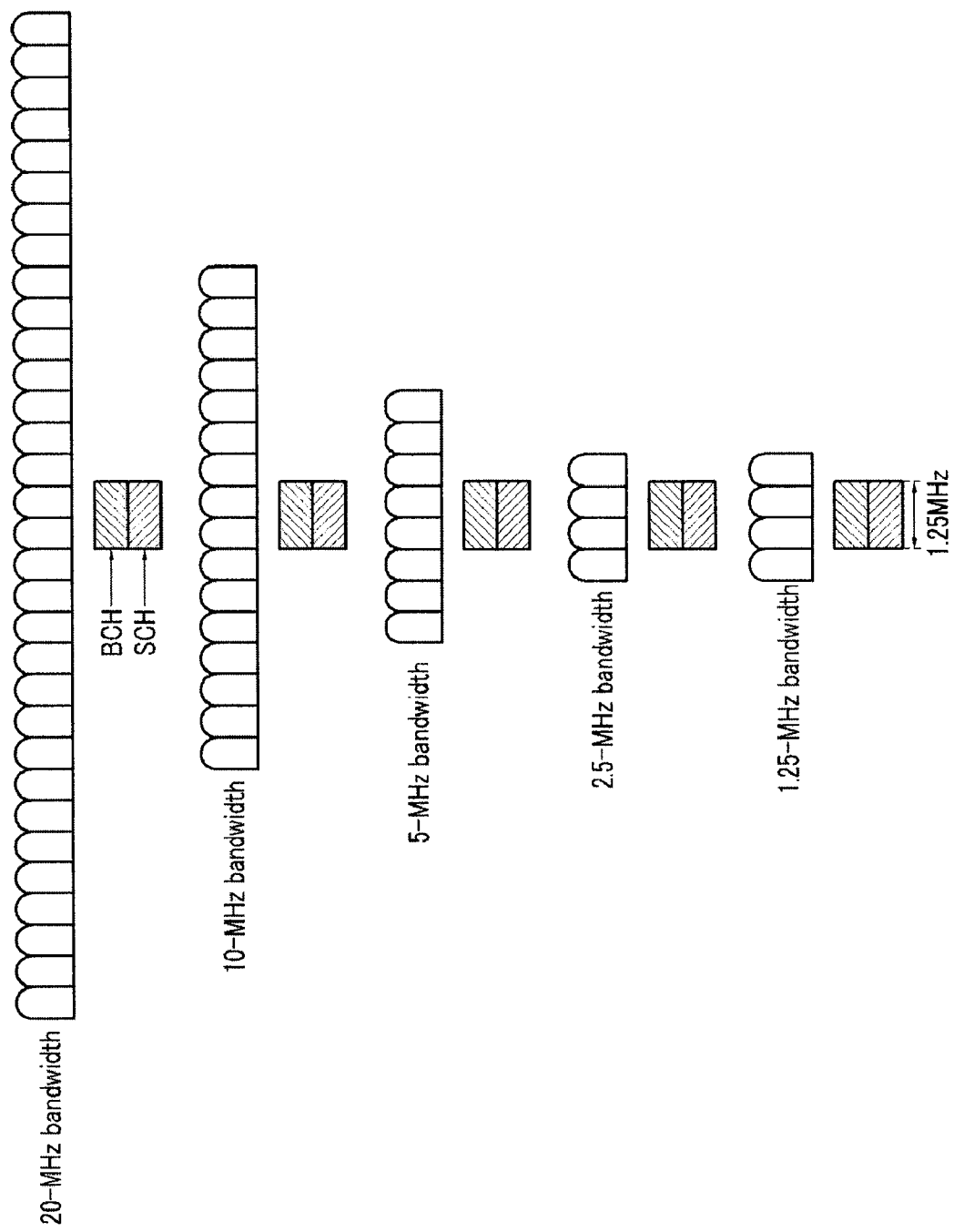
[FIG. 5]

[FIG. 6]
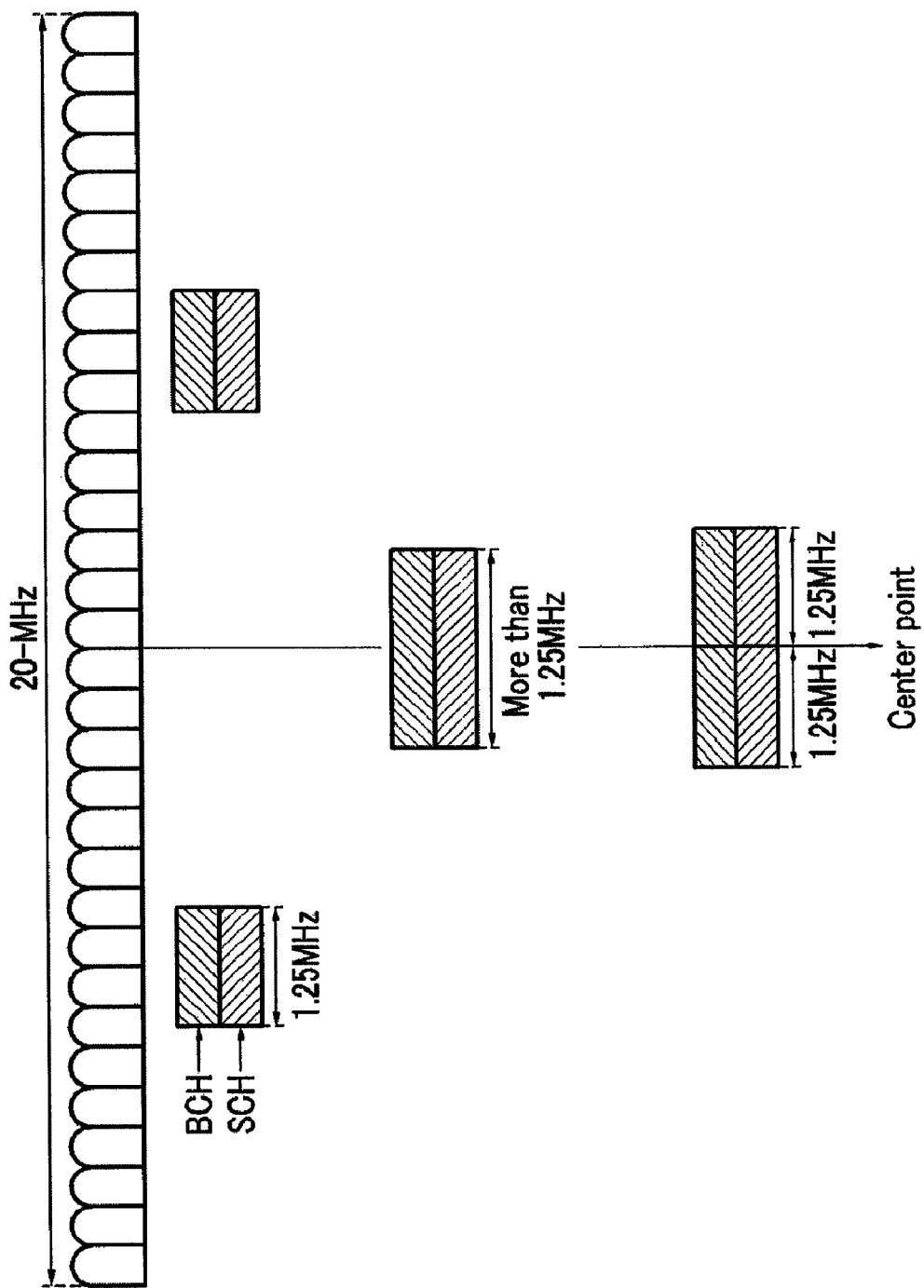

[FIG. 7]
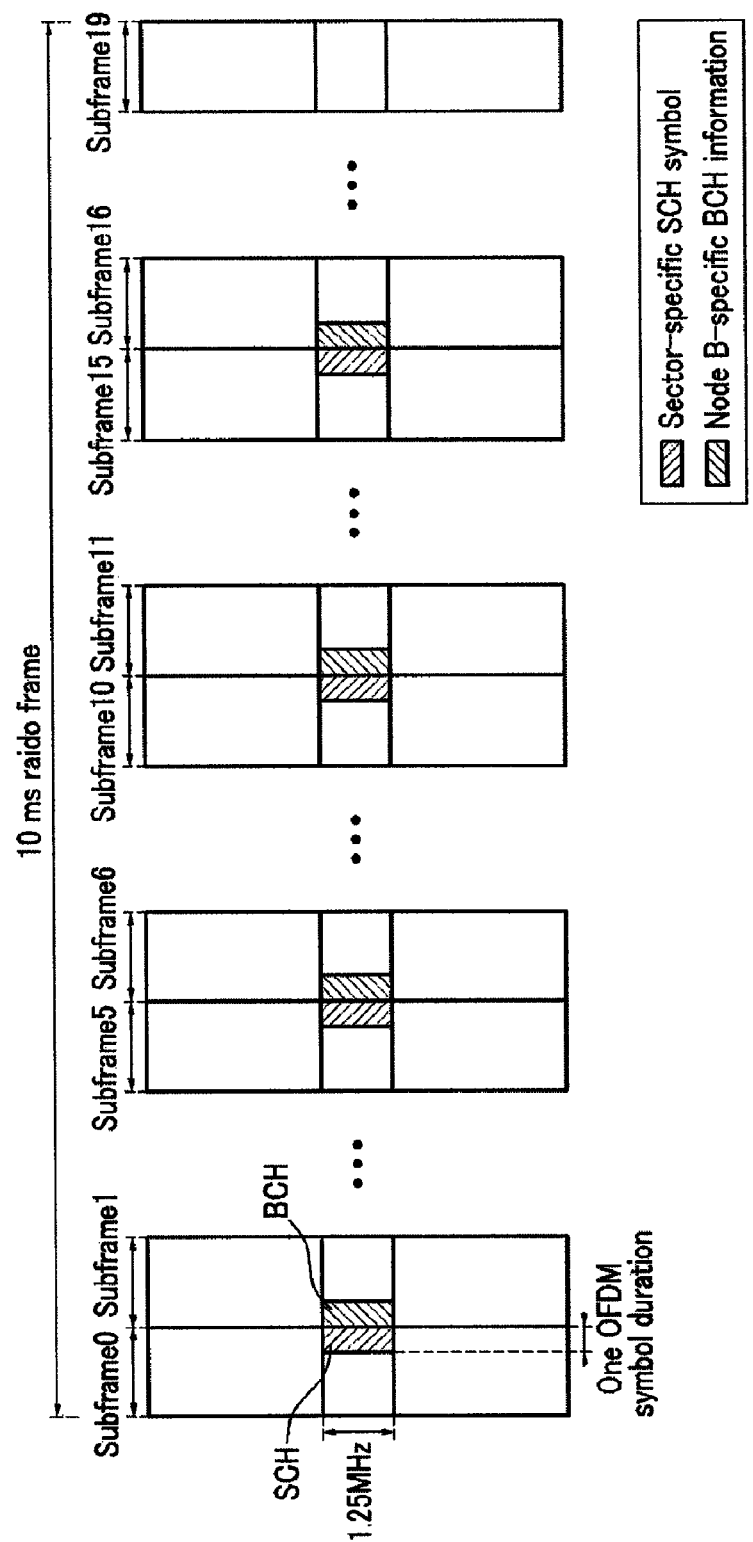

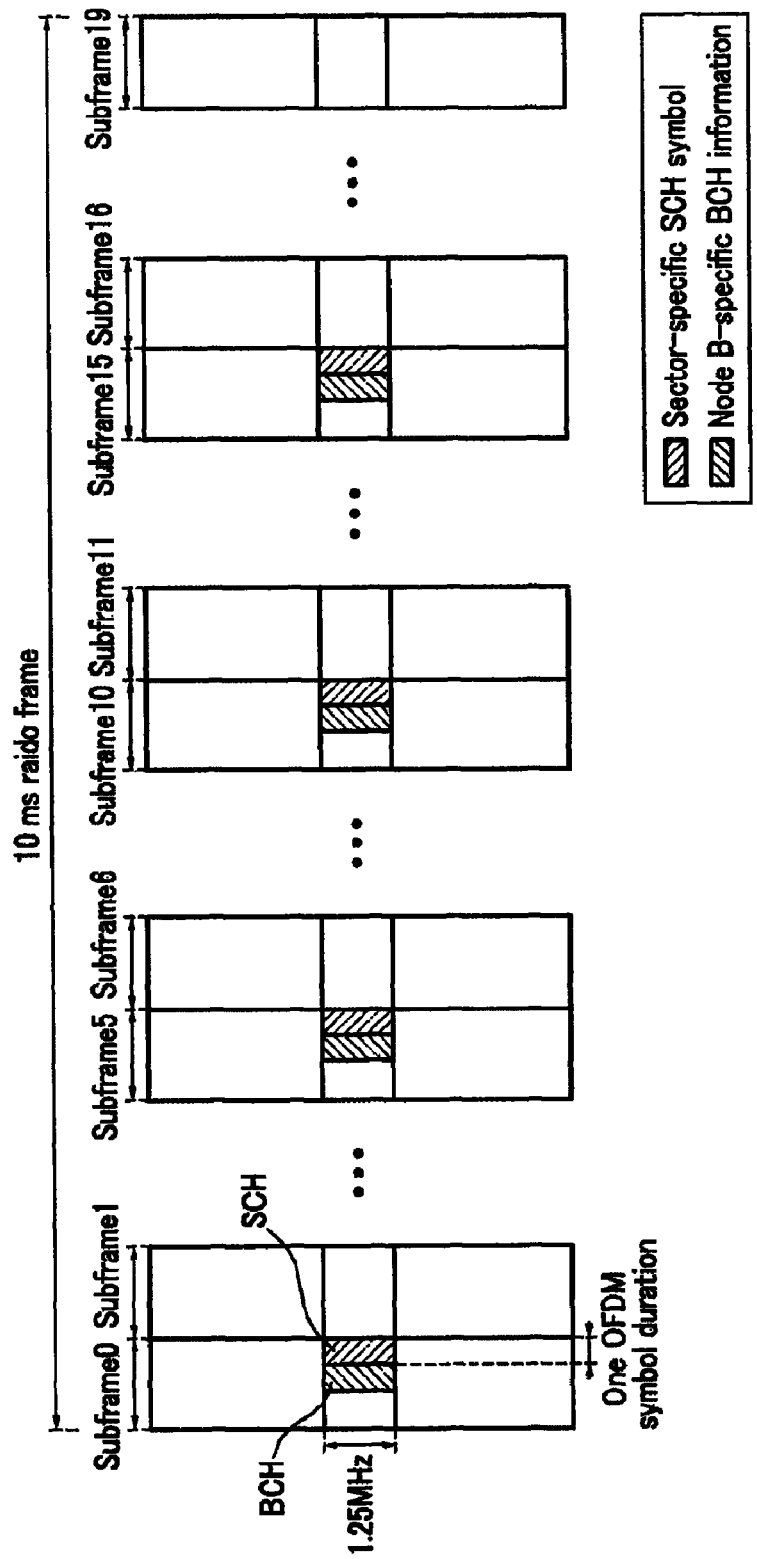
[FIG. 8]

[FIG. 9]
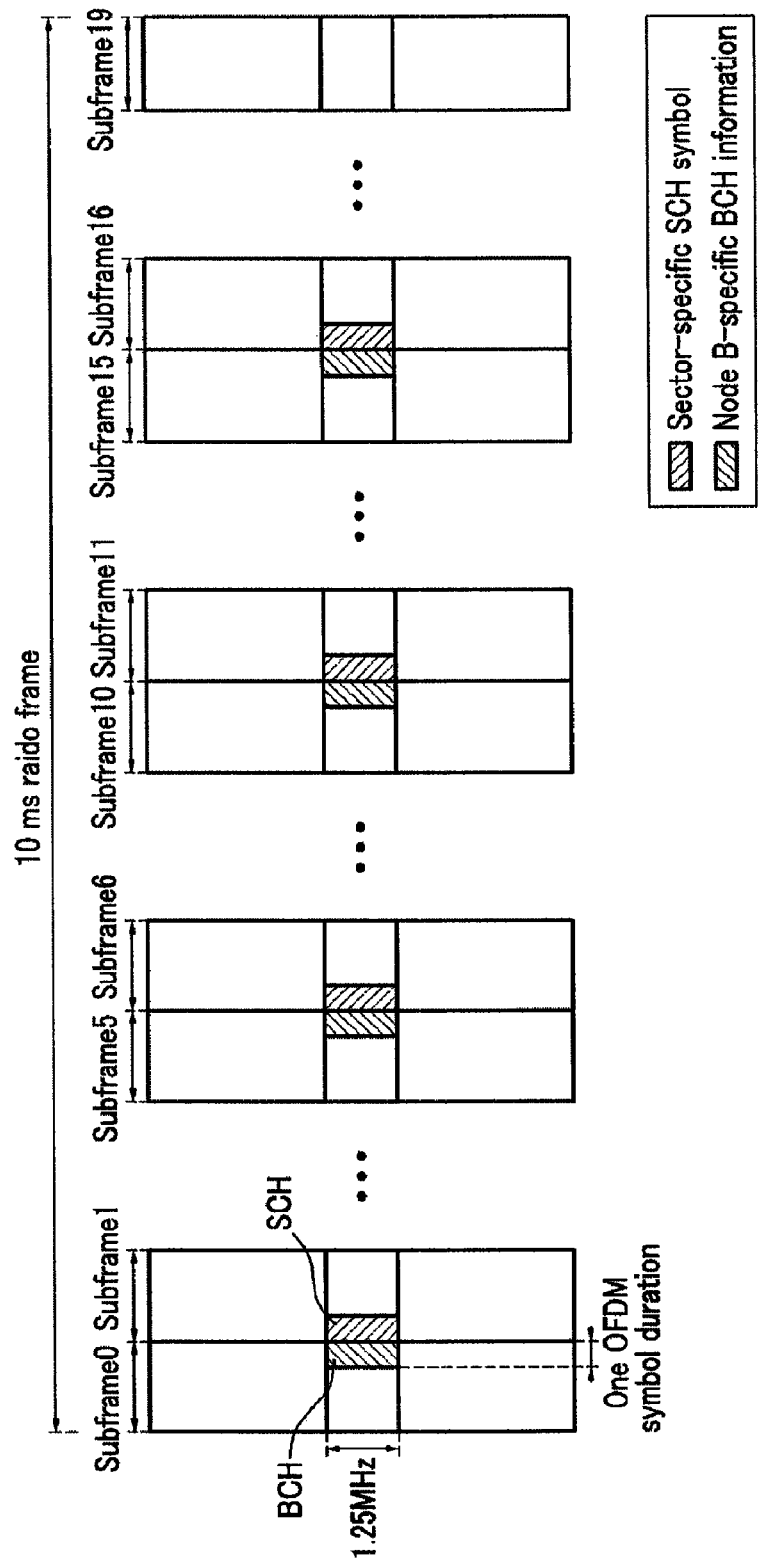

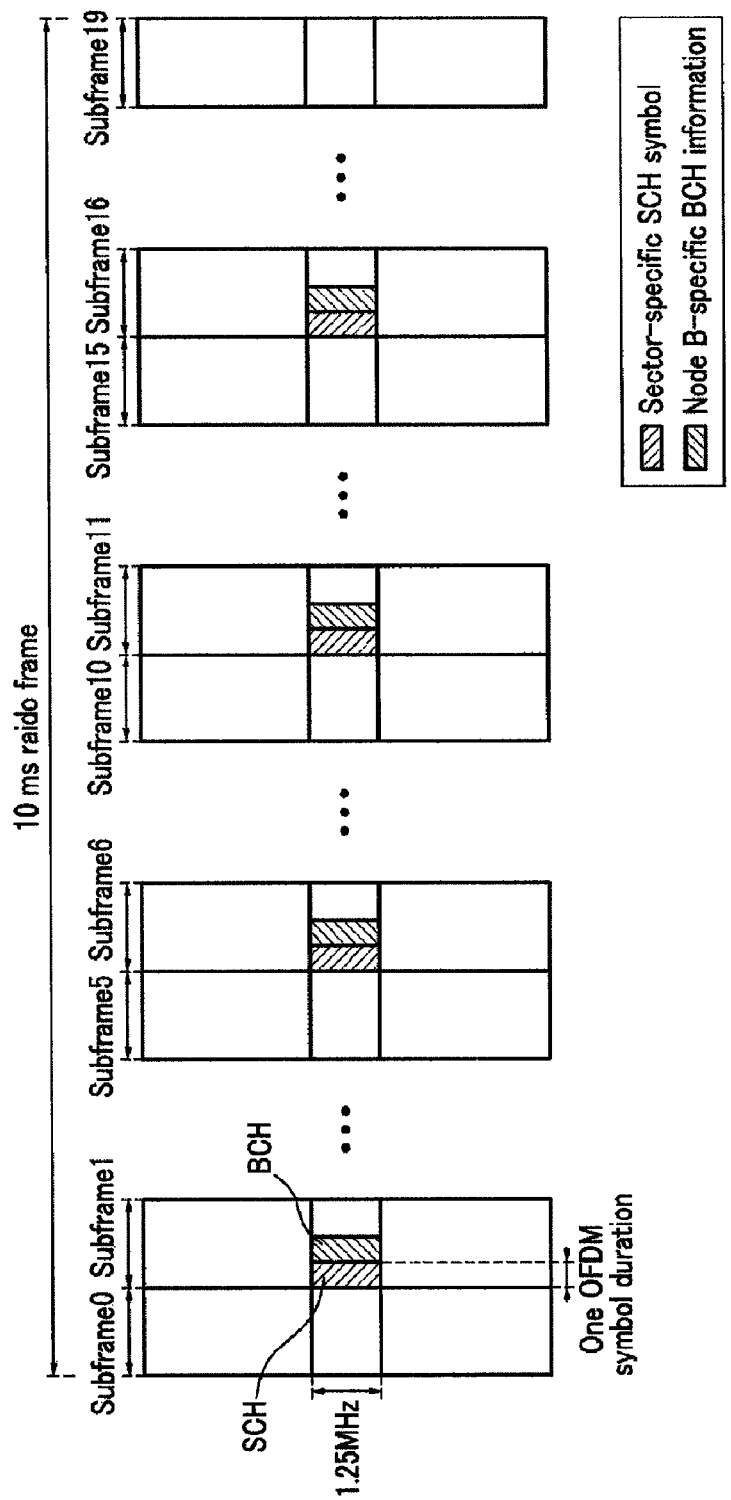
[FIG. 10]

[FIG. 11]
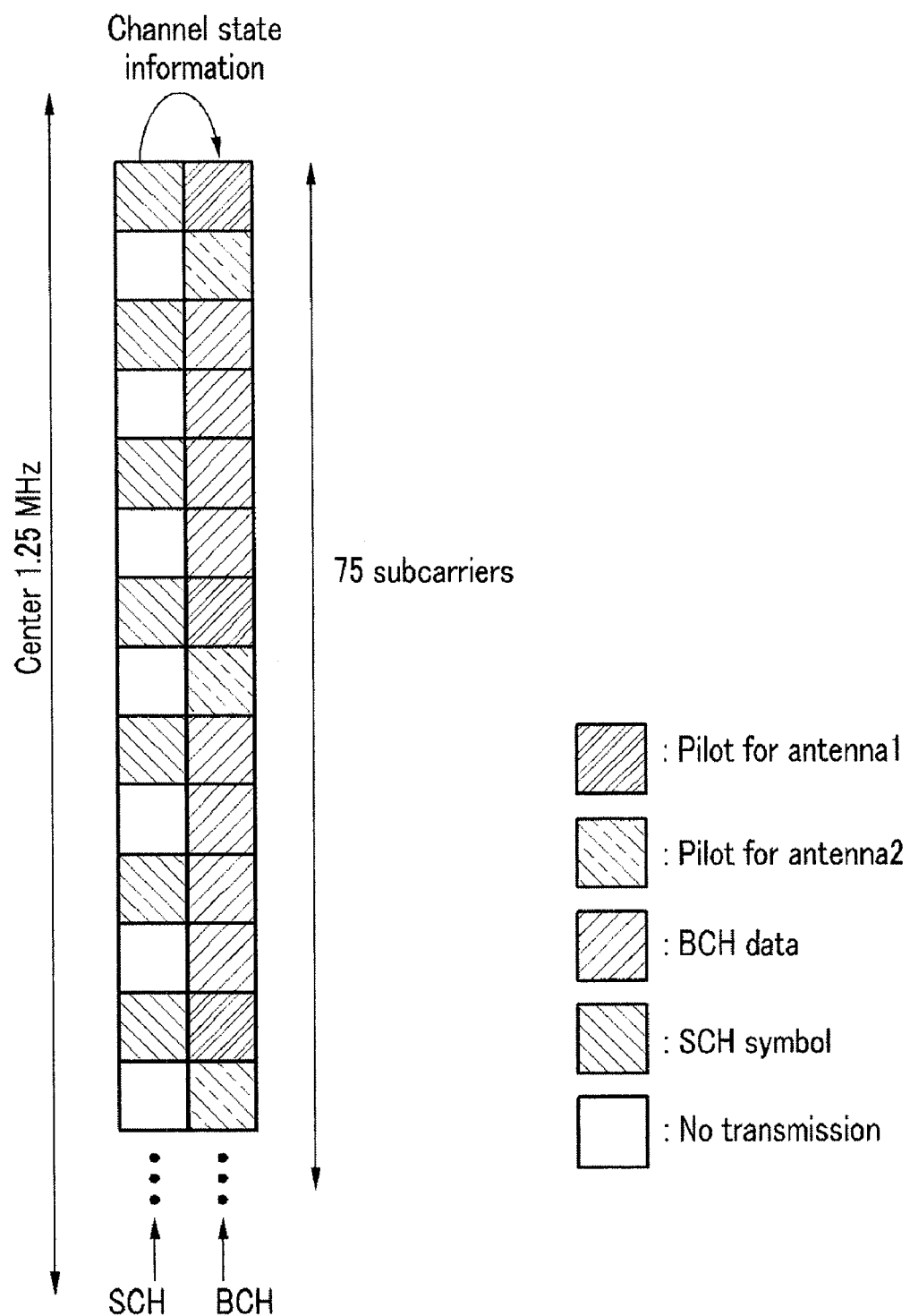

【FIG. 12】
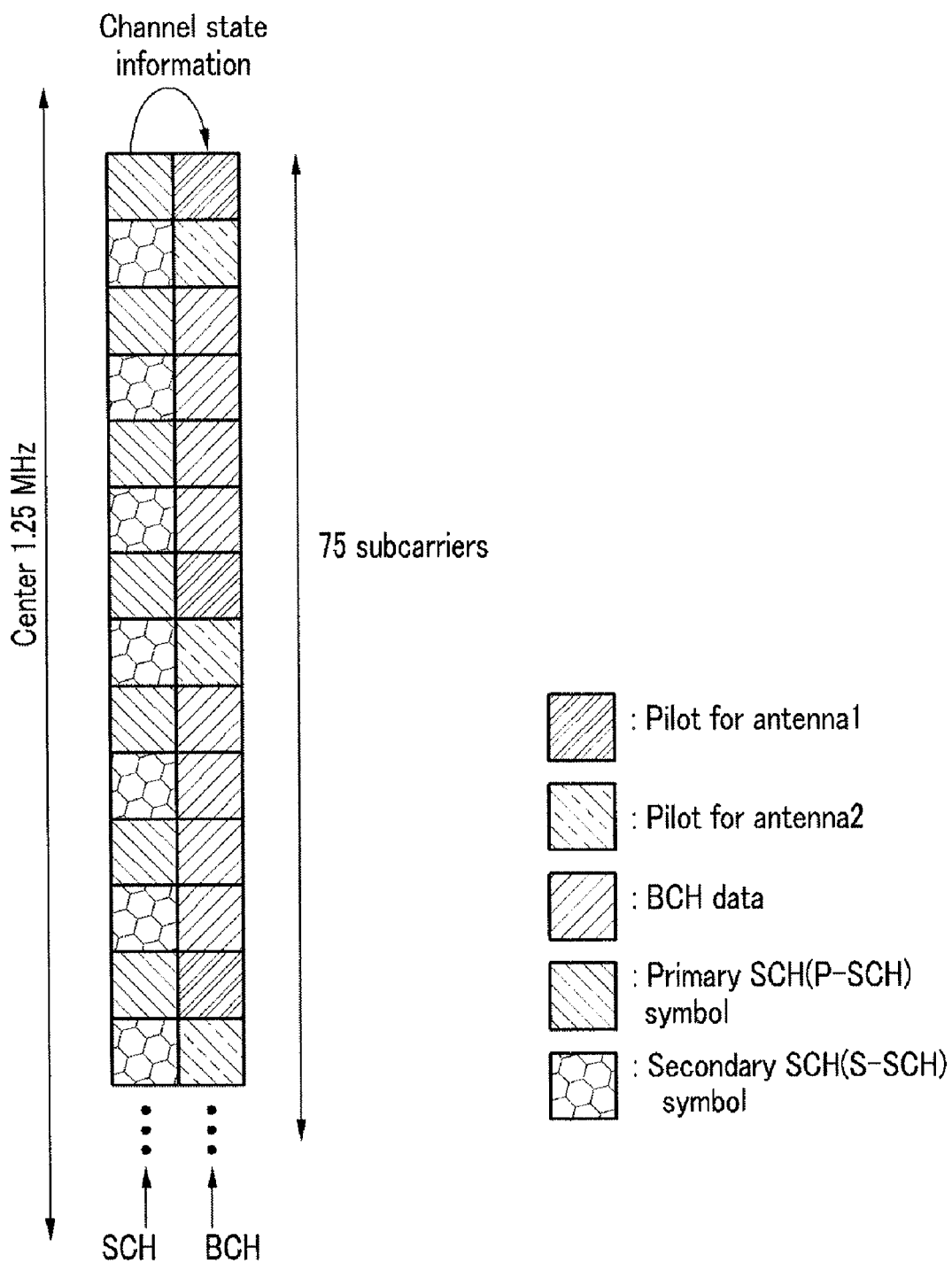

[FIG. 13]
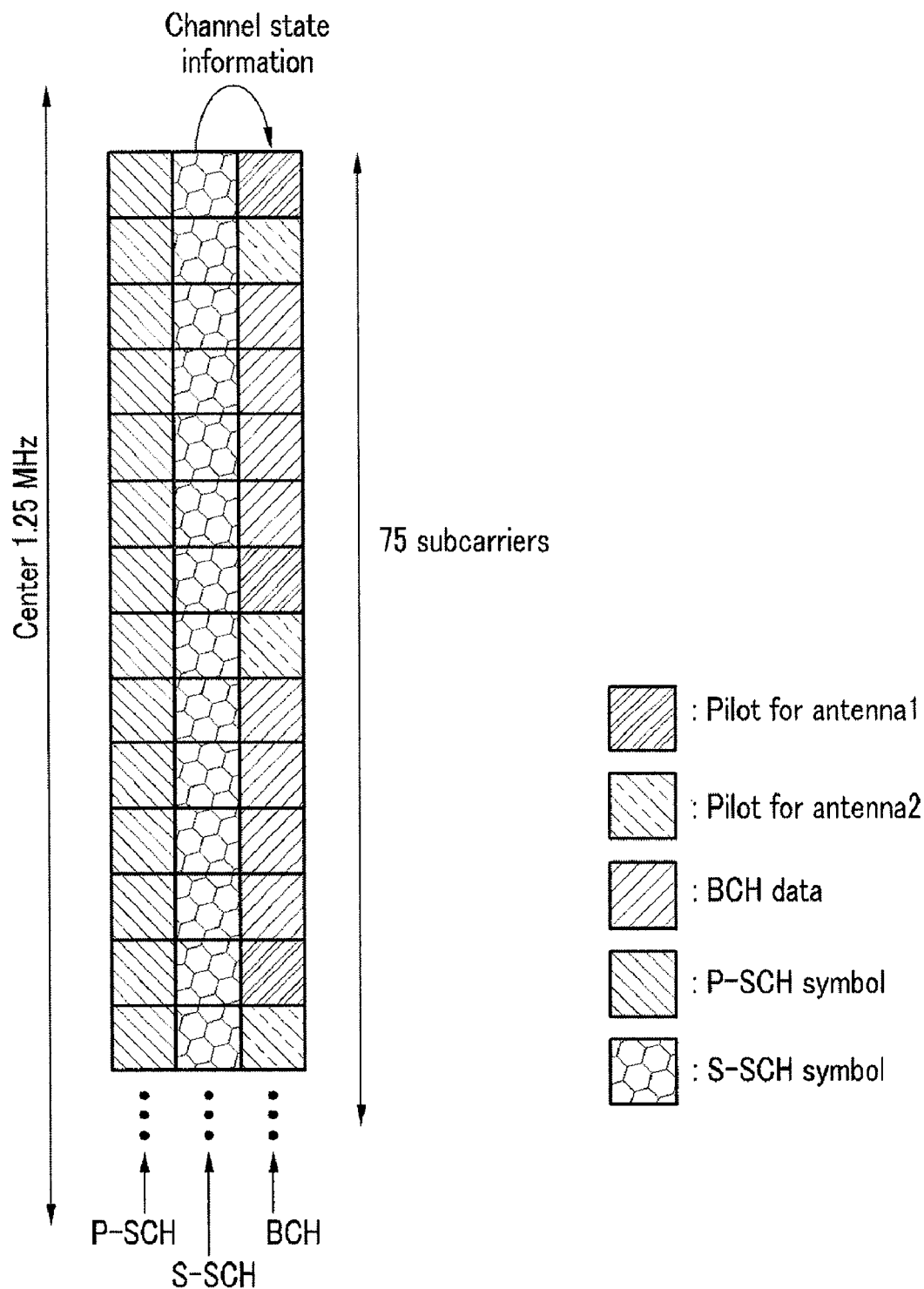

【FIG. 14】
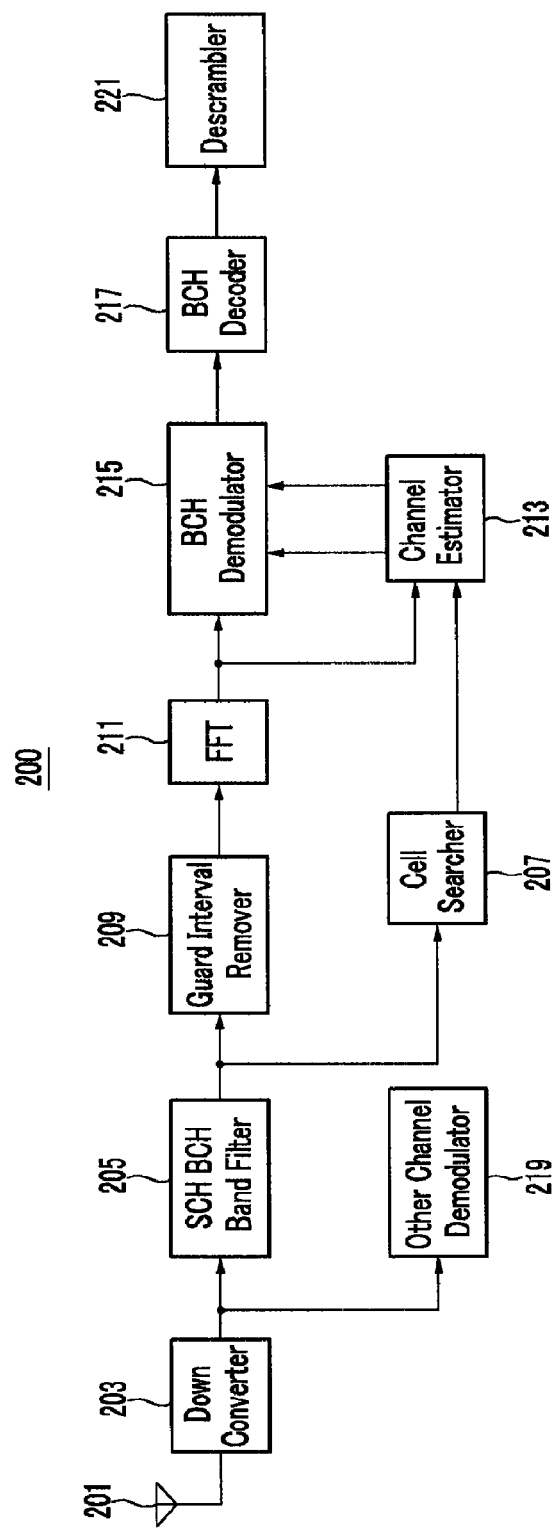

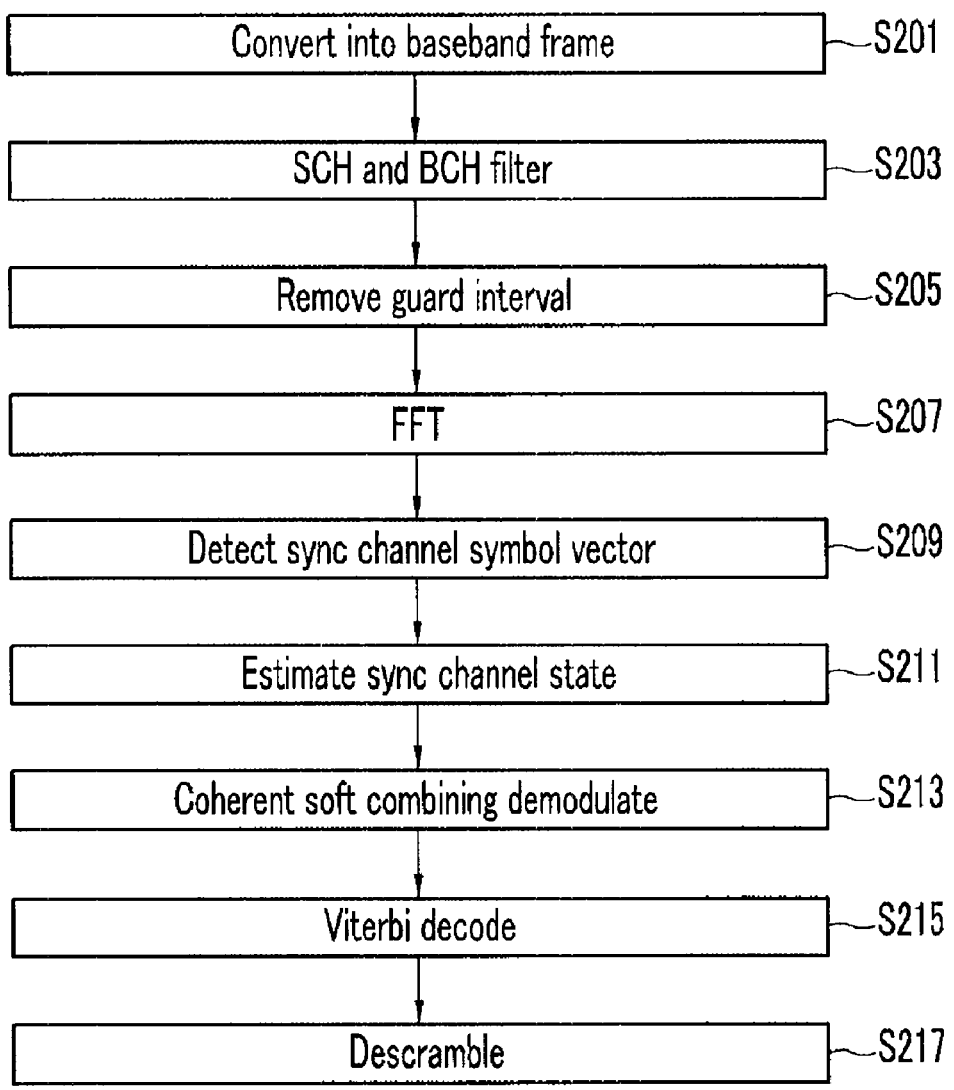
[FIG. 15]

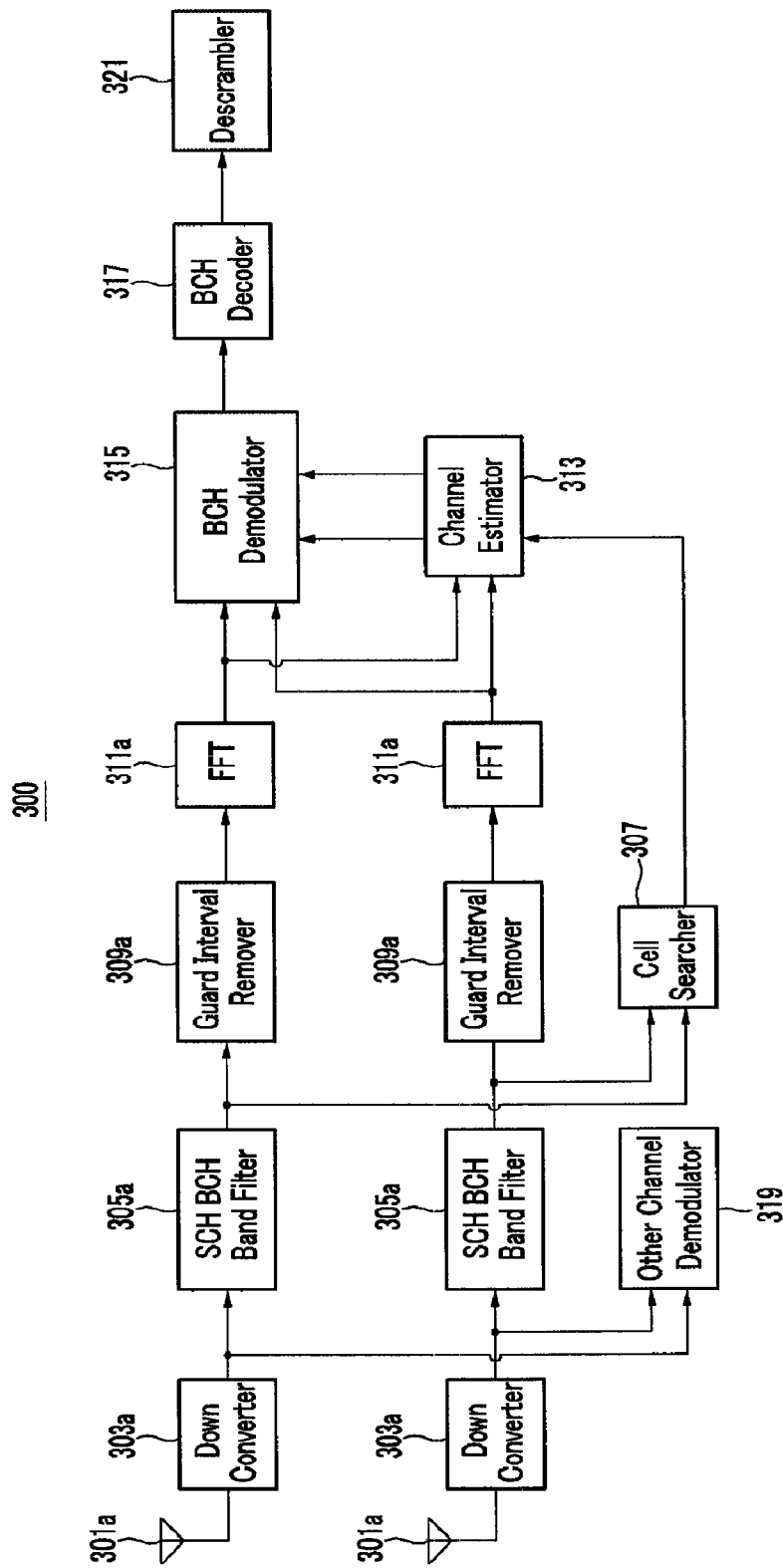
[FIG. 16]

[FIG. 17]
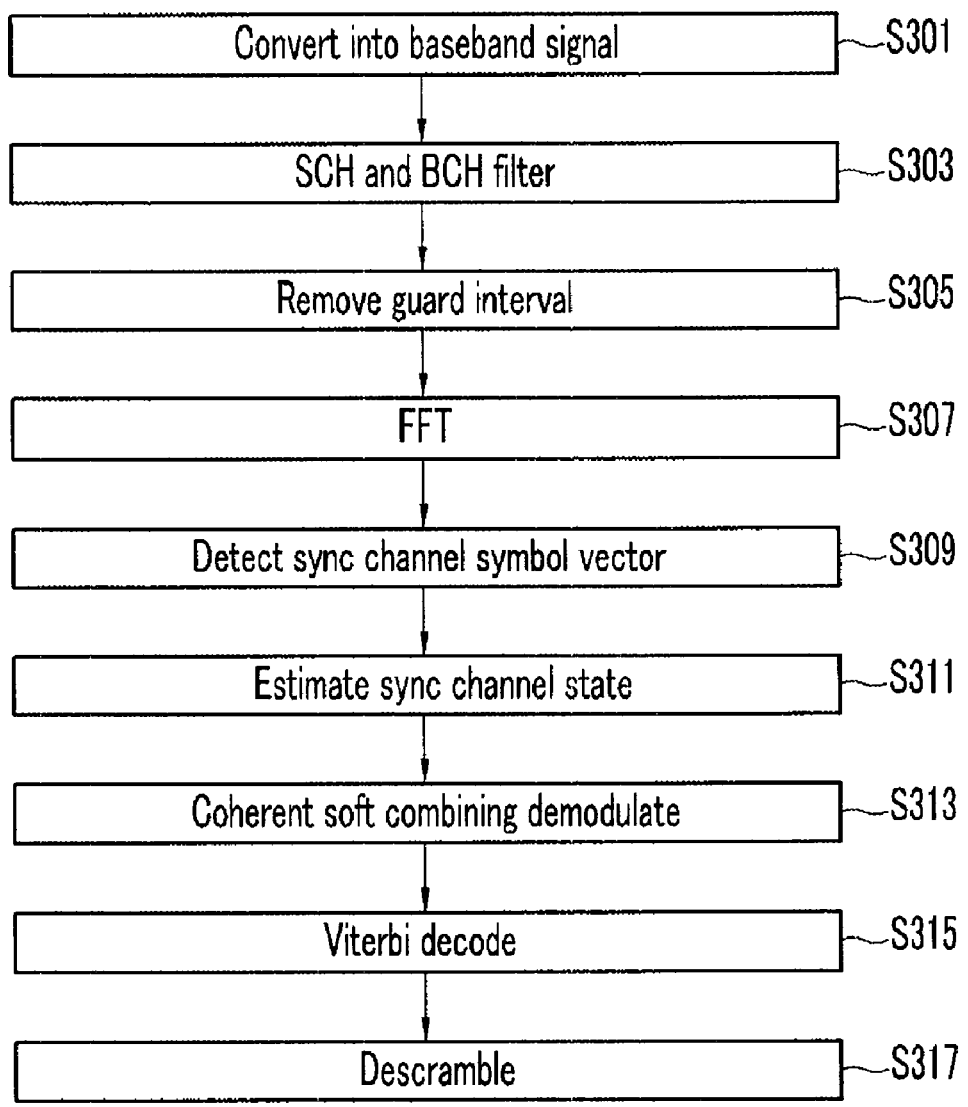

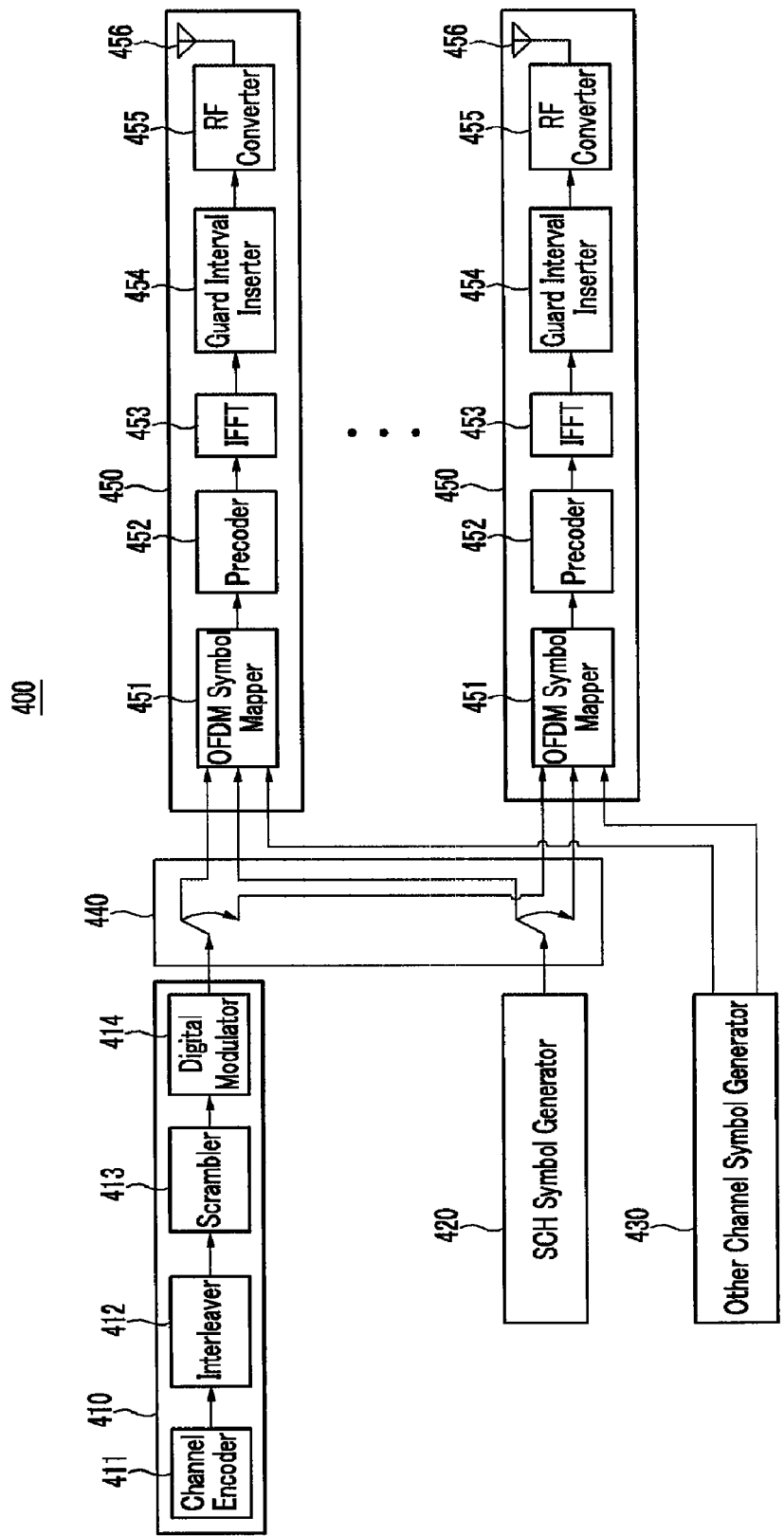
[FIG. 18]

[FIG. 19]
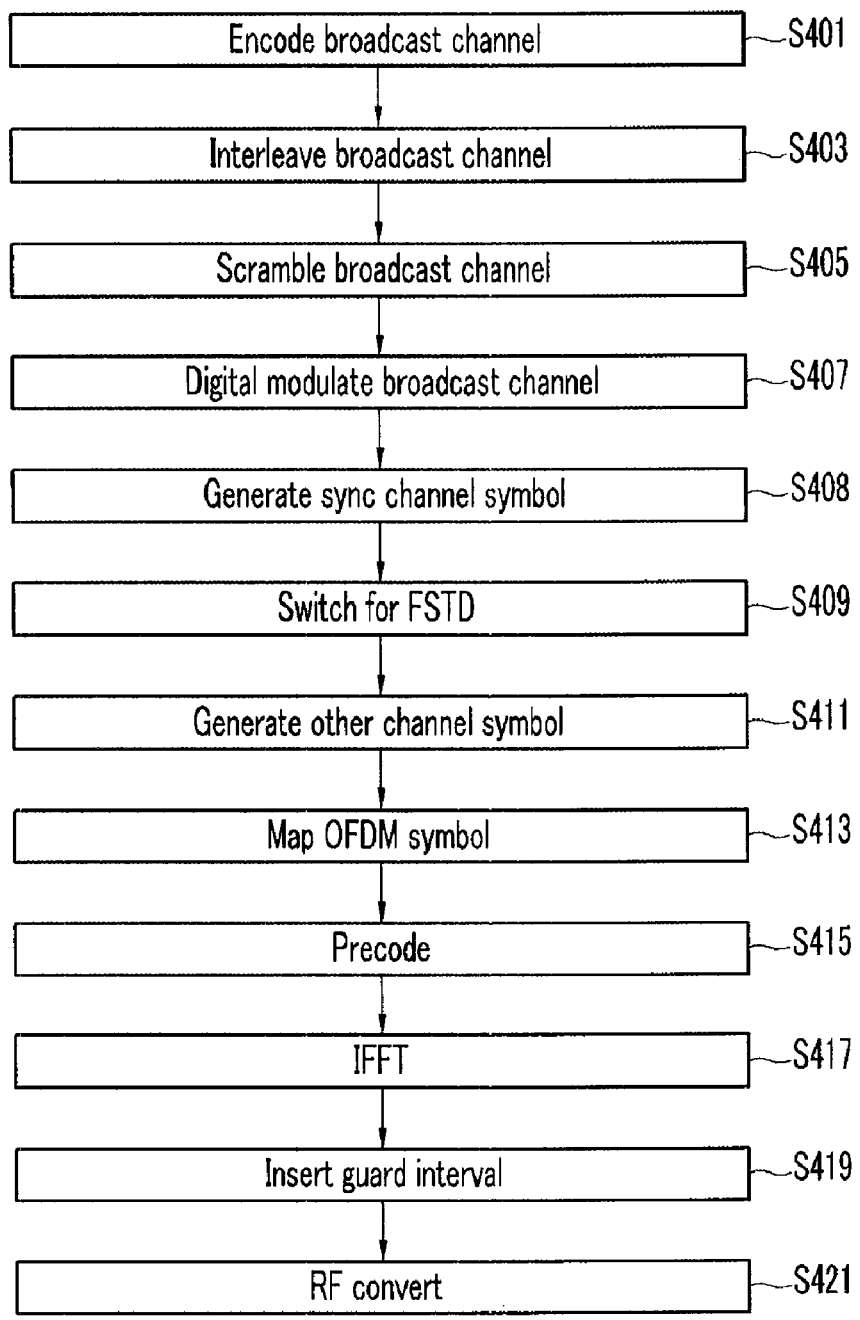

[FIG. 20]
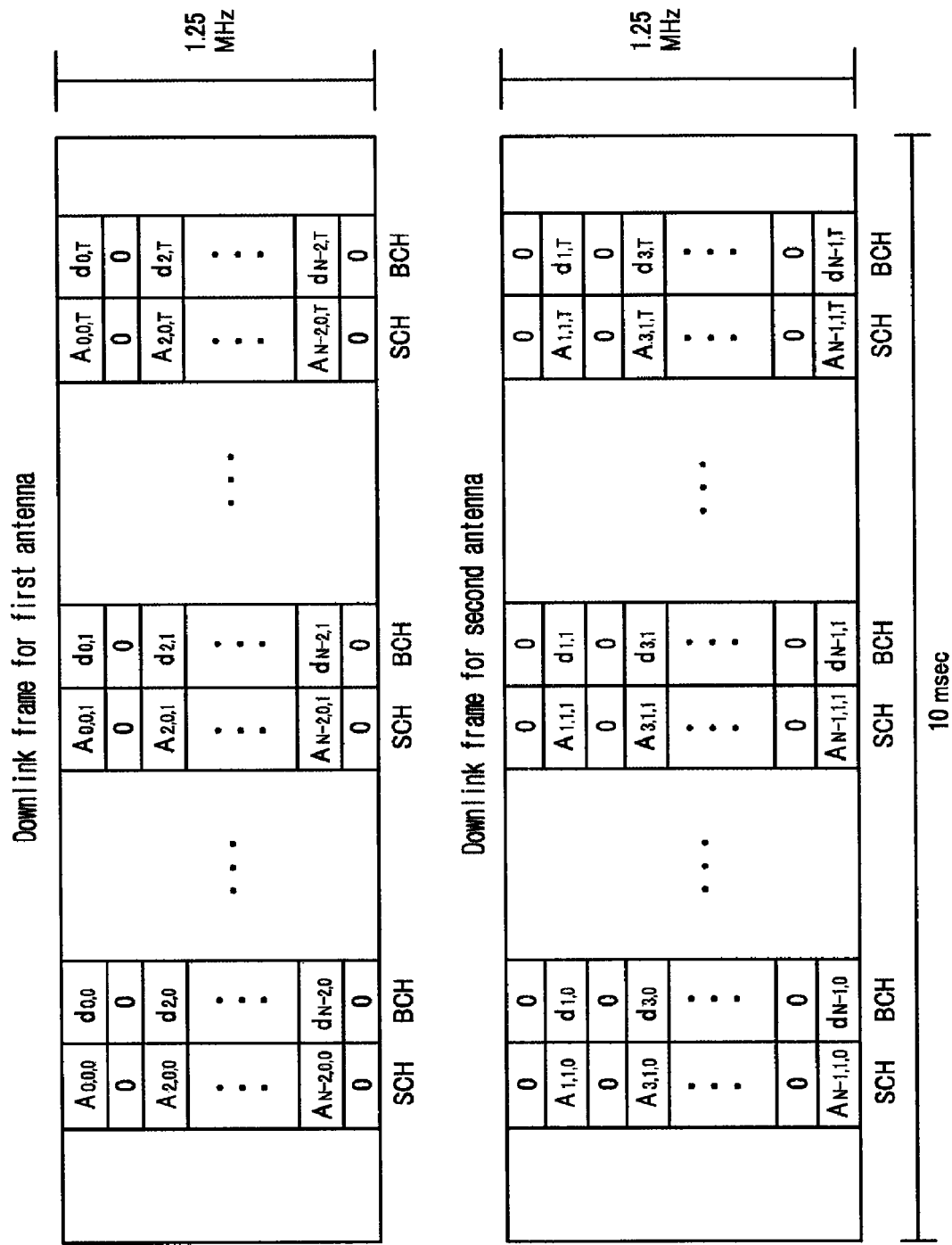

【FIG. 21】
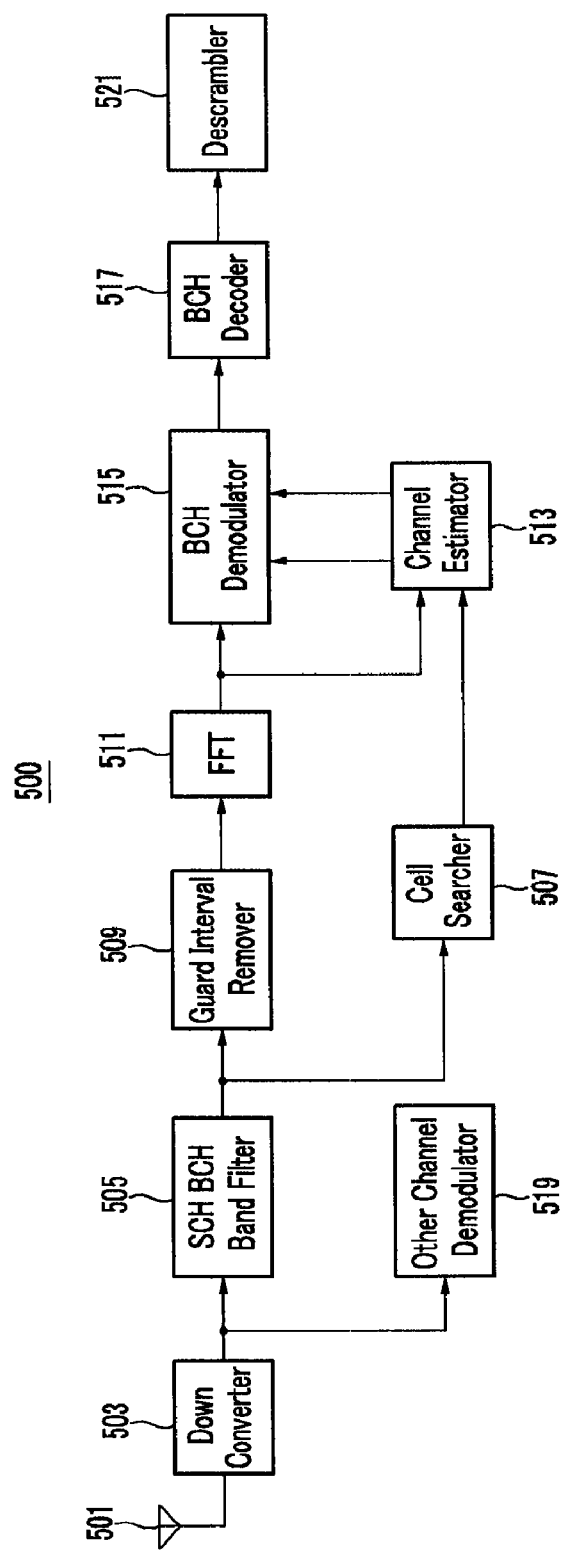

[FIG. 23]
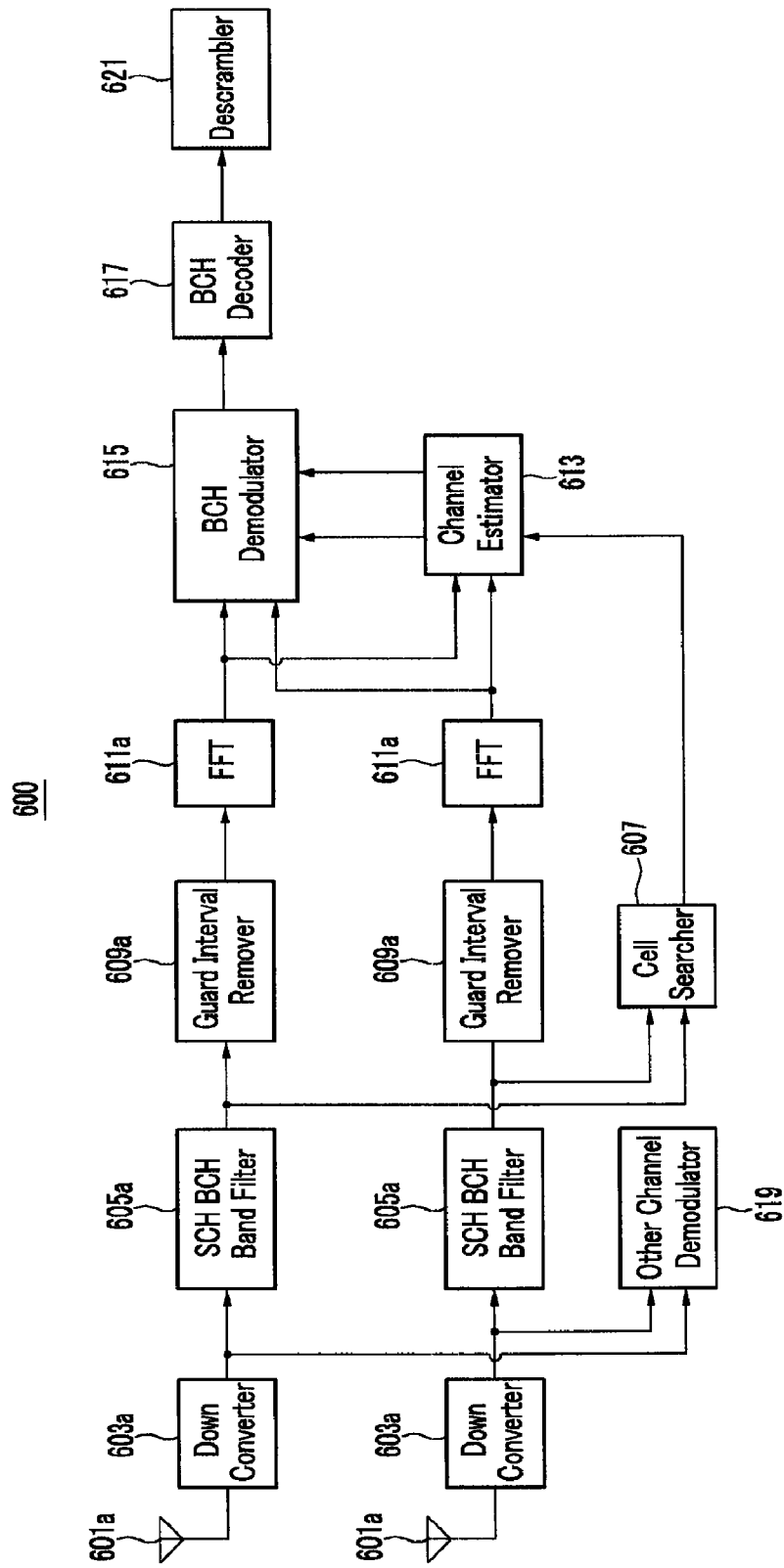

[FIG. 24]
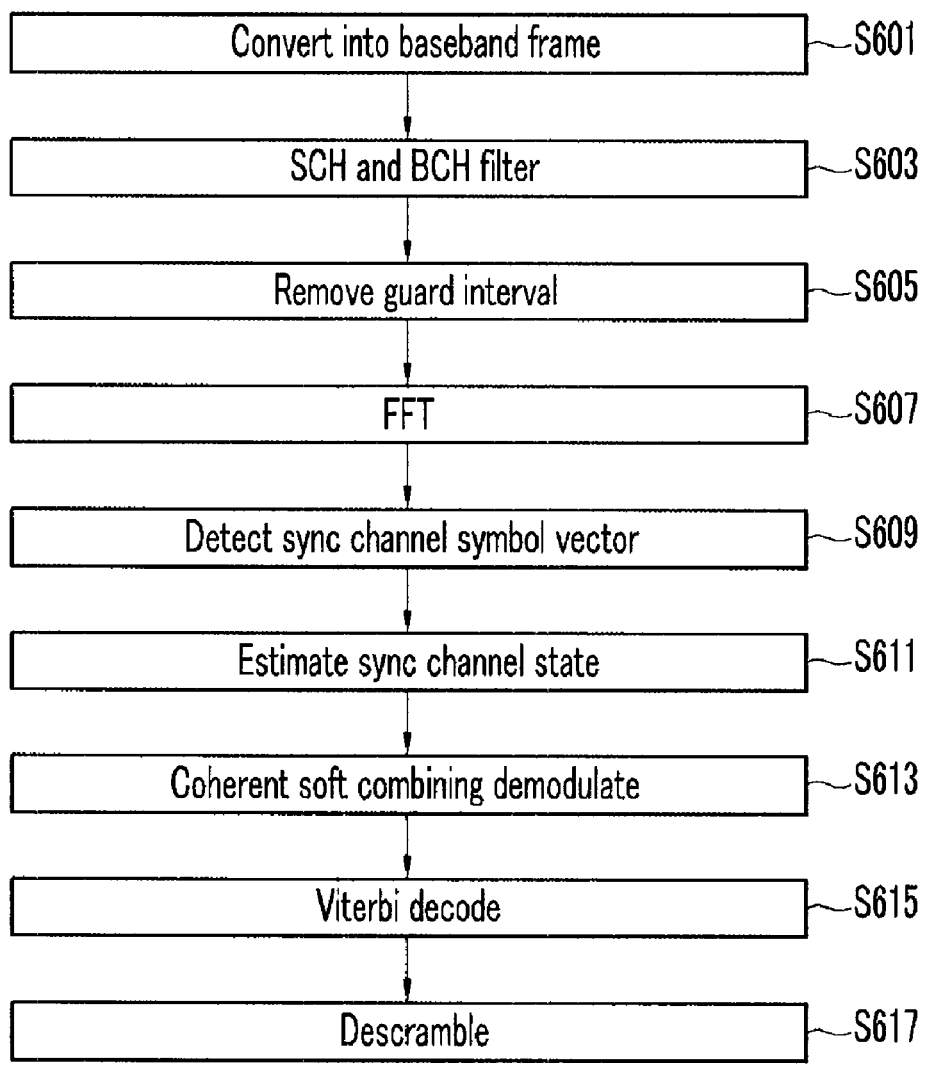

METHOD FOR GENERATING AND TRANSMITTING DOWNLINK FRAME

RELATED APPLICATIONS

This application is a 35 U.S.C. §371 national stage filing of PCT Application No. PCT/KR2007/005793 filed on Nov. 16, 2007, which claims priority to, and the benefit of, Korean Patent Application No. 10-2006-0113455 filed on Nov. 16, 2006. The contents of the aforementioned applications are hereby incorporated by reference.

TECHNICAL FIELD

The present invention relates to a method for generating and transmitting a downlink frame, receiving the downlink frame, and restoring broadcasting channel information in the downlink frame.

BACKGROUND ART

A mobile station is required to support the 1.25 MHz to 20 MHz system bandwidth based on orthogonal frequency division multiplexing (OFDM), and efficiently receive broadcast channel (BCH) information in the initial system access stage. The mobile station also needs to receive the BCH information with the reception quality being greater than a predetermined reference value.

However, the complexity of the mobile station may be increased in order to increase the reception quality of BCH information.

DISCLOSURE

Technical Problem

The present invention has been made in an effort to provide a method for generating and transmitting a downlink frame for reducing complexity of a mobile station and improving a reception quality of BCH, and a method for receiving a downlink frame and restoring BCH information in the downlink frame.

Technical Solution

In one aspect of the present invention, a method for generating a downlink frame includes arranging a plurality of synchronization channel symbols and a plurality of broadcasting channel symbols to neighbor each other on a time axis, and applying a precoding vector to the synchronization channel symbols and the broadcasting channel symbols to generate a plurality of downlink frames respectively corresponding to a plurality of antennas, wherein a preceding vector is variable by a sector for transmitting the downlink frames.

The preceding vector is further variable by a subframe in which the broadcasting channel symbols are positioned.

The preceding vector is independent of an index of a subcarrier.

The step of arranging includes arranging the synchronization channel symbols and the broadcasting channel symbols in a common bandwidth of a system.

In another aspect of the present invention, a method for transmitting a downlink frame for respectively transmitting a plurality of downlink frames including a first downlink frame and a second downlink frame through a plurality of antennas including a first antenna and a second antenna includes: arranging a first symbol from among a plurality of synchronization channel symbols and a nulling symbol to a first subcarrier and a second subcarrier of a first symbol section of the first downlink frame; arranging a second symbol from among a plurality of broadcasting channel symbols and a nulling symbol to a third subcarrier and a fourth subcarrier of a second symbol section of the first downlink frame; arranging a nulling symbol and a third symbol from among the synchronization channel symbols to a fifth subcarrier and a sixth subcarrier of a third symbol section of the second downlink frame; arranging a nulling symbol and a fourth symbol from among the broadcasting channel symbols to a seventh subcarrier and an eighth subcarrier of a fourth symbol section of the second downlink frame; applying a first preceding weight corresponding to the first antenna to the first symbol and the second symbol; and applying a second precoding weight corresponding to the second antenna to the third symbol and the fourth symbol.

The first symbol section and the third symbol section are the same sections, the second symbol section and the fourth symbol section are the same sections, the second symbol section neighbors the first symbol section, and the fourth symbol section neighbors the second symbol section on a time axis. The first subcarrier, the third subcarrier, the fifth subcarrier, and the seventh subcarrier are the same, and the second subcarrier, the fourth subcarrier, the sixth subcarrier, and the eighth subcarrier are the same.

The first precoding weight and the second precoding weight are elements of a preceding vector, and the precoding vector is variable by a sector for transmitting the downlink frames.

Advantageous Effects

According to the exemplary embodiment of the present invention, the BCH bandwidth and the SCH bandwidth are the same so that the mobile station does not need to perform a blind detection process on the BCH bandwidth.

Further, according to the exemplary embodiment of the present invention, since the base station positions the BCH and the SCH to be temporally near each other and applies the same transmission diversity on the BCH and the SCH, the mobile station does not need to perform a blind detection process on the number of transmit antennas so as to demodulate the BCH information.

In addition, the mobile station uses the SCH to estimate the channel states of a plurality of sectors and coherently demodulate the BCH, and hence the BCH's demodulation performance is improved and there is no need to allocate the pilot symbol. The mobile station does not need to check information on the influencing sector.

DESCRIPTION OF DRAWINGS

FIG. 1 shows a communication system according to an exemplary embodiment of the present invention.

FIG. 2 shows a base station according to an exemplary embodiment of the present invention.

FIG. 3 is a block diagram for a sector transmitter according to an exemplary embodiment of the present invention.

FIG. 4 is a flowchart for a sector transmitting method according to an exemplary embodiment of the present invention.

FIG. 5 shows bandwidth allocation on a SCH and a BCH according to an exemplary embodiment of the present invention.

FIG. 6 shows bandwidth allocation on a SCH and a BCH according to another exemplary embodiment of the present invention.

FIG. 7 to FIG. 10 show frequency domain downlink frames on which an SCH and a BCH are mapped according to exemplary embodiments of the present invention.

FIG. 11 to FIG. 13 show part of the downlink frames on which the SCH symbol and the BCH symbol are mapped according to exemplary embodiments of the present invention.

FIG. 14 is a block diagram for a downlink frame receiving device according to an exemplary embodiment of the present invention.

FIG. 15 is a flowchart for a signal receiving method according to an exemplary embodiment of the present invention.

FIG. 16 is a block diagram for a signal receiving device according to another exemplary embodiment of the present invention.

FIG. 17 is a flowchart for a signal receiving method according to another exemplary embodiment of the present invention.

FIG. 18 is a block diagram for a sector transmitter according to another exemplary embodiment of the present invention.

FIG. 19 is a flowchart for a sector transmitting method according to another exemplary embodiment of the present invention.

FIG. 20 shows a downlink frame in which the same FSTD is applied to the SCH and the BCH according to an exemplary embodiment of the present invention.

FIG. 21 is a block diagram for a downlink frame receiving device according to another exemplary embodiment of the present invention.

FIG. 23 is a block diagram for a signal receiving device according to another exemplary embodiment of the present invention.

FIG. 24 is a flowchart for a signal receiving method according to another exemplary embodiment of the present invention.

BEST MODE

Figure 22:
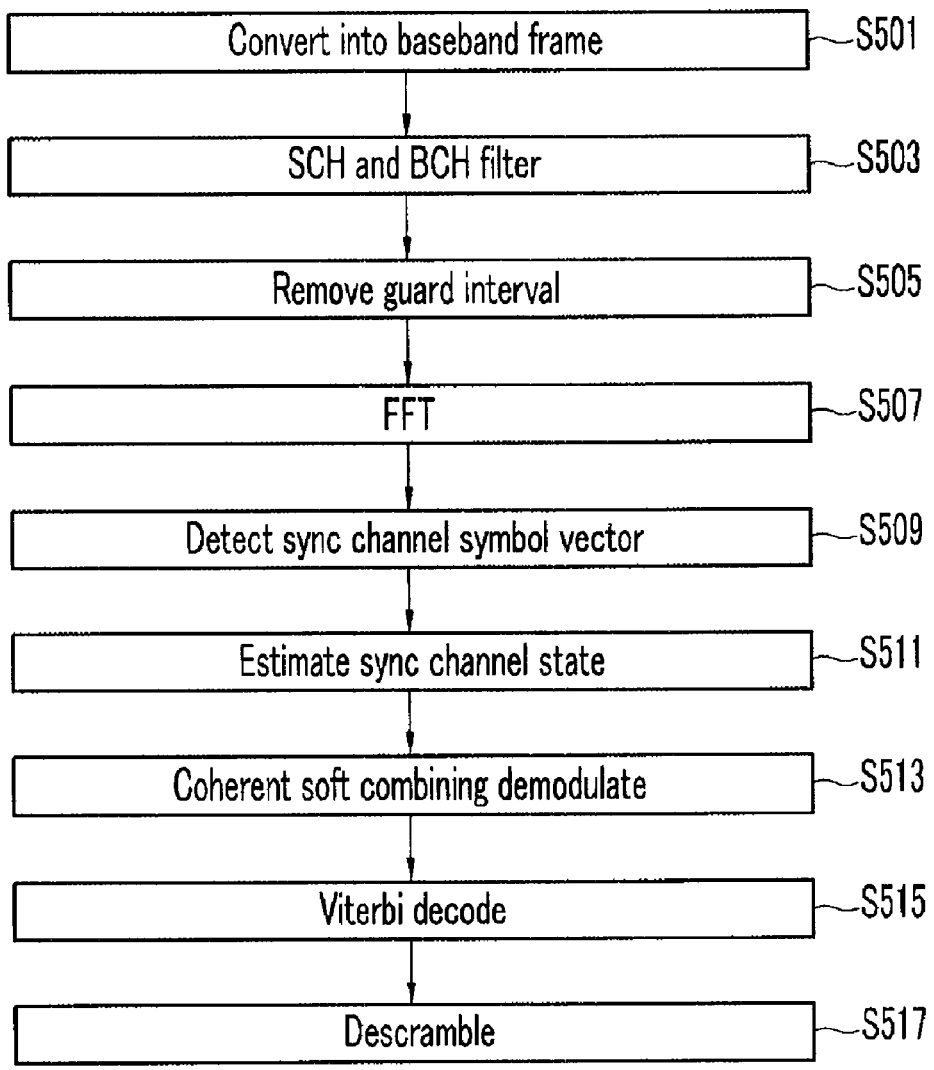
FIG. 22 is a flowchart for a signal receiving method according to another exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" and variations such as "comprises" will be understood to imply the inclusion of stated elements but not the exclusion of any other elements. Also, the terms of a unit, a device, and a module in the present specification represent a unit for processing a predetermined function or operation, which can be realized by hardware, software, or a combination of hardware and software.

Throughout the specification, a mobile station (MS) represents a terminal, a mobile terminal (MT), a subscriber station (SS), a portable subscriber station (PSS), user equipment (UE), and an access terminal (AT), and includes entire or partial functions of the terminal, mobile terminal, subscriber station, portable subscriber station, user equipment, and access terminal.

A base station (BS) represents an access point (AP), a radio access station (RAS), a nodeB (Node-B), an evolved Node-B (eNB), a base transceiver station (BTS), and a mobile multi-hop relay (MMR)-BS, and includes entire or partial functions of the AP, RAS, Node-B, eNB, BTS, and MMR-BS.

A communication system according to an exemplary embodiment of the present invention will now be described with reference to FIG. 1 and FIG. 2.

FIG. 1 shows a communication system according to an exemplary embodiment of the present invention. FIG. 2 shows a base station according to an exemplary embodiment of the present invention.

As shown in FIG. 1, the communication system includes a base station 20 and a mobile station 30. As shown in FIG. 2, the base station 20 includes a first sector transmitter 21, a second sector transmitter 22, and a third sector transmitter 23.

The base station 20 controls a cell 10. The cell 10 includes a first sector 11, a second sector 12, and a third sector 13. The cell 10 is described to include three sectors in the exemplary embodiment of the present invention, and it can include two or four or more sectors. The base station 20 communicates with the mobile station 30 in the cell 10.

The first sector transmitter 21, the second sector transmitter 120, and the third sector transmitter 130 respectively control the first sector 11, the second sector 12, and the third sector 13. That is, the first sector transmitter 110 communicates with the mobile station in the first sector 11, the second sector transmitter 120 communicates with the mobile station in the second sector 12, and the third sector transmitter 130 communicates with the mobile station in the third sector 13.

The first sector transmitter 110, the second sector transmitter 120, and the third sector transmitter 130 respectively transmit synchronization channel (SCH) information and broadcast channel (BCH) information to the first sector 11, the second sector 12, and the third sector 13. The SCH information is different for each sector, and the BCH information is common to all the sectors. That is, the SCH information is identified by the sector, and the BCH information is identified by the cell. The BCH information is transmitted to all the mobile stations 30 through a predefined individual physical channel. The first sector transmitter 21, the second sector transmitter 22, and the third sector transmitter 23 are synchronized so that the mobile station 30 may demodulate the BCH information through a soft-combining process.

The sector to which the mobile station 30 belongs from among a plurality of sectors configuring the cell 10 will be called a home sector. Referring to FIG. 1, the mobile station 30 considers a first sector having the greatest receiving power as the home sector from among the sectors of the same base station.

The mobile station 30 can receive the signal transmitted by the second sector transmitter 120 with the receiving power that is greater than a threshold value since the mobile station 30 is neighboring the second sector. The sector influencing the mobile station 30 among the sectors except the home sector from among a plurality of sectors configuring the cell 10 will be referred to as a target sector.

A sector transmitter according to an exemplary embodiment of the present invention will now be described with reference to FIG. 3 and FIG. 4.

FIG. 3 is a block diagram for a sector transmitter 100 according to an exemplary embodiment of the present invention.

As shown in FIG. 3, the sector transmitter 100 transmits the signal to the s-th sector, and includes a BCH symbol generator 110, an SCH symbol generator 120, an additional channel symbol generator 130, a symbol duplicator 140, and a plurality of transmitters 150. The BCH symbol generator 110 includes a channel encoder 111, an interleaver 112, a scrambler 113, and a digital modulator 114. The transmitters 150 respectively includes an OFDM symbol mapper 151, a precoder 152, an inverse fast Fourier transformer (IFFT) 153, a guard interval inserter 154, a radio frequency (RF) converter 155, and an antenna 156.

FIG. 4 is a flowchart for a sector transmitting method according to an exemplary embodiment of the present invention.

In detail, the channel encoder 111 performs a channel coding process (e.g., turbo coding or convolution coding) on the BCH data that correspond to the BCH message packet to generate and output channel encoded BCH data (S101). The channel encoder 111 can receive the BCH message packet from an upper layer for each 10 msec that corresponds to the frame length, or for each 20 msec, 30 msec, or 40 msec.

The interleaver 112 changes the order of the channel encoded BCH data output by the channel encoder 111 to generate and output interleaved BCH data (S103).

The scrambler 113 scrambles the interleaved BCH data output by the interleaver 112 to generate and output scrambled BCH data (S105).

The digital modulator 114 performs a digital modulation process (e.g., binary phase shift key (BPSK) or quadrature amplitude modulation (QAM)) on the scrambled BCH data output by the scrambler 113 to generate and output a plurality of BCH symbols (S107).

The SCH symbol generator 120 generates and outputs a plurality of SCH symbols (S108). When the number of SCH symbols included by the subframe that has a SCH is given as N, the SCH symbol generator 120 generates and outputs a SCH symbol vector expressed in Equation 1, for the sector s.

$$A_T = [A_{0,T} A_{1,T}, \ldots, A_{i,T}, \ldots, A_{n-1,T}] \quad \text{(Equation 1)}$$

In Equation 1, $A_{i,T}$ is an SCH symbol transmitted from the T-th subcarrier to the i-th subcarrier from among the symbol sections in which the SCH is disposed. The SCH symbol vector $A_T$ is changeable according to the index T of the symbol section.

The SCH symbol generator 120 uses the SCH scrambling code of Equation 2 so as to generate the SCH symbol vector of Equation 1.

$$a_T = [a_{0,T} a_{1,T}, \ldots, a_{i,T}, \ldots, a_{N-1,T}] \quad \text{(Equation 2)}$$

The SCH scrambling code for one subframe in one frame can be different from or equal to the SCH scrambling code for another subframe.

The SCH symbol generator 120 uses the SCH scrambling code of Equation 2 to scramble the SCH symbol (u) that is specific by the base station and generate the SCH symbol vector of Equation 1. In this instance, the element $A_{i,T}$ of the SCH symbol vector is acquired from Equation 3. The value of the SCH symbol (u) specific by the base station is changeable by the standard, for example, it can be 1 or $(1+j)/\sqrt{2}$.

$$A_{i,T} = \mu \cdot a_{i,T}, i=0,1,\ldots,N-1 \quad \text{(Equation 3)}$$

The symbol duplicator 140 duplicates the BCH symbol output by the BCH symbol generator 110 to output it to a plurality of transmitters 150, and duplicates the SCH symbol output by the SCH symbol generator 120 to output it to a plurality of transmitters 150 (S109).

The additional channel symbol generator 130 generates and outputs a plurality of additional channel symbols to a plurality of transmitters 150 (S111).

The transmitters 150 use a plurality of BCH symbols output by the BCH symbol generator 110, a plurality of SCH symbols output by the SCH symbol generator 120, and a plurality of additional channel symbols output by the additional channel symbol generator 130 to generate a plurality of time domain downlink frames that correspond to a plurality of antennas 156, and then transmit the same to the s-th sector through the antennas 156.

In detail, a plurality of OFDM symbol mappers 151 map a plurality of BCH symbols output by the BCH symbol generator 110, a plurality of SCH symbols output by the SCH symbol generator 120, and a plurality of additional channel symbols output by the additional channel symbol generator 130 on a plurality of subcarriers and a plurality of symbol sections to generate a plurality of frequency domain downlink frames that respectively correspond to a plurality of antennas 156 (S113). That is, the OFDM symbol mappers 151 perform a time division multiplexing process and a frequency division multiplexing process on a plurality of BCH symbols, a plurality of SCH symbols, and a plurality of additional channel symbols. A mapping method by the OFDM symbol mapper 151 will now be described with reference to FIG. 5 to FIG. 13.

FIG. 5 shows bandwidth allocation on an SCH and a BCH according to an exemplary embodiment of the present invention.

As shown in FIG. 5, the sector transmitter 100 uses various bandwidths of 1.25 MHz, 2.5 MHz, 5 MHz, 10 MHz, and 20 MHz as the system bandwidth.

Referring to FIG. 5, the OFDM symbol mapper 151 allocates a plurality of BCH symbols and a plurality of SCH symbols to the central bandwidth that is common to various system bandwidths. Also, the OFDM symbol mapper 151 allocates the same bandwidth as that allocated to a plurality of SCH symbols to a plurality of BCH symbols. Accordingly, the mobile station 30 does not need to perform a blind detection process on the BCH bandwidth so as to demodulate the BCH symbol.

FIG. 6 shows bandwidth allocation on an SCH and a BCH according to another exemplary embodiment of the present invention.

As shown in FIG. 6, when the system bandwidth is 20 MHz, the OFDM symbol mapper 151 allocates the central bandwidth of the right bandwidth and the left bandwidth of 10 MHz each to the SCH and the BCH, the central bandwidth of 20 MHz to the SCH and the BCH, and the right bandwidth and the left bandwidth of 1.25 MHz each with reference to the system bandwidth to the SCH and the BCH.

FIG. 7 to FIG. 10 show frequency domain downlink frames on which an SCH and a BCH are mapped according to exemplary embodiments of the present invention.

As shown in FIG. 7 to FIG. 10, the downlink frame includes 20 subframes. The SCH and the BCH are mapped on the central bandwidth of 1.25 MHz of the system bandwidth.

According to the exemplary embodiment of FIG. 7 to FIG. 10, the OFDM symbol mapper 151 multiplexes BCH information to four subframes during one downlink frame section. The BCH information is transmitted as a packet to the mobile station 30, and in detail, a BCH information packet is multiplexed in a frame and is transmitted for each 10 msec, and in addition, it can be multiplexed in at least two frames and can then be transmitted for each 20 msec, 30 msec, or 40 msec.

In the exemplary embodiment of the present invention, the multiplexing method for transmitting the BCH information through a unicast channel can be used, and the multiplexing method for transmitting the same through a multicast channel or a multimedia broadcast and multicast service (MBMS) channel can also be used.

Referring to FIG. 7, the OFDM symbol mapper 151 maps the SCH symbol on the last OFDM symbol section of each subframe at regular intervals of five subframes. The OFDM symbol mapper 151 maps the BCH symbol on the next OFDM symbol sections of the OFDM symbol section on which the SCH symbol is mapped.

Referring to FIG. 8, the OFDM symbol mapper 151 maps the SCH symbol on the last OFDM symbol section of each subframe at regular intervals of five subframes. The OFDM symbol mapper 151 maps the BCH symbol on the previous OFDM symbol sections of the OFDM symbol section on which the SCH symbol is mapped.

Referring to FIG. 9, the OFDM symbol mapper 151 maps the BCH symbol on the last OFDM symbol section of each subframe at regular intervals of five subframes. The OFDM symbol mapper 151 maps the SCH symbol on the next OFDM symbol sections of the OFDM symbol section on which the SCH symbol is mapped.

Referring to FIG. 10, the OFDM symbol mapper 151 maps the SCH symbol on the start OFDM symbol section of each subframe at regular intervals of five subframes. The OFDM symbol mapper 151 maps the BCH symbol on the next OFDM symbol sections of the OFDM symbol section on which the SCH symbol is mapped.

As shown in FIG. 7 to FIG. 10, when the OFDM symbol mapper 151 maps the SCH symbol and the BCH symbol on the downlink frame to be neighboring with each other on the time axis and the SCH symbol and the BCH symbol are transmitted through the same antenna, the SCH symbol and the BCH symbol undergo the same channel fading. Therefore, the mobile station 30 can perform a coherent demodulation process on the BCH information by using SCH estimation information. Performance of channel estimation using a pilot channel in which reference signals are disposed at regular intervals of six subcarriers is not better than performance of channel estimation using the SCH in which the synchronization symbol is disposed at intervals of one or two subcarriers.

FIG. 11 to FIG. 13 show part of the downlink frames on which the SCH symbol and the BCH symbol are mapped according to exemplary embodiments of the present invention.

FIG. 11 represents the case in which the number of SCH's is 1, and FIG. 12 and FIG. 13 represent the case in which the number of SCH's is 2. When the number of SCH's is 2, the first one is set to be a primary synchronization channel (P-SCH) and the second one is set to be a secondary synchronization channel (S-SCH).

Referring to FIG. 11, the OFDM symbol mapper 151 maps a plurality of SCH symbols in one OFDM symbol section at regular intervals of two subcarriers.

Referring to FIG. 12, the OFDM symbol mapper 151 allocates a plurality of P-SCH symbols and a plurality of S-SCH symbols to an OFDM symbol section through the frequency division multiplexing (FDM) process. In this case, when the sequence for the P-SCH is common to all the sectors 11, 12, and 13 and the base station 20, the S-SCH can be used for channel estimation. Also, when the number of sequences for the P-SCH is equal to or greater than 3, the sequences are allocated to the sector, and different sequences are allocated between the neighboring sectors, the P-SCH can also be used for BCH channel estimation in a like manner of the S-SCH.

Referring to FIG. 13, the OFDM symbol mapper 151 allocates a plurality of P-SCH symbols and a plurality of S-SCH symbols to two neighboring OFDM symbol sections through the time division multiplexing (TDM) process. In this instance, the S-SCH can be used for channel estimation. Also, as described above, the P-SCH can be used for channel estimation. When the S-SCH occupies an odd-numbered or even-numbered subcarrier, the mobile station 30 can estimate the channel through the odd-numbered or even-numbered subcarrier. When the S-SCH occupies all the subcarriers, the mobile station 30 can estimate the channel through all the subcarriers.

FIG. 4 will be further described.

A plurality of precoders 152 respectively apply a precoding vector to the neighboring SCH symbols and the BCH symbols in the downlink frame as expressed in Equation 4 (S115).

$$C_{k,a,s,T} = B_{a,s,T} d_{k,T} \quad \text{(Equation 4)}$$

In Equation 4, k is an index of a subcarrier for transmitting the BCH symbol, a is an index of the antenna, and $d_{k,T}$ is a BCH symbol transmitted from the T-th subcarrier to the k-th subcarrier from among the symbol sections in which the BCH is disposed. Referring to FIG. 8, T is 0 in the case of the BCH and the SCH of the subframe 0, T is 1 in the case of the BCH and the SCH of the subframe 5, T is 2 in the case of the BCH and the SCH of the subframe 10, and T is 3 in the case of the BCH and the SCH of the subframe 15. $B_{a,s,T}$ is a precoding weight that is the a-th element of the precoding vector $B_{s,T}$ corresponding to the sector s and the symbol section T.

An example of the precoding vector $B_{s,T}$ is given in Equation 5.

$$B_{s,T} = [\, B_{0,s,T} \quad B_{1,s,T} \,] \quad \text{(Equation 5)}$$
$$B_{1,T} = [\, 1 \quad e^{j(f(L,T)+0)} \,],$$
$$B_{2,T} = [\, 1 \quad e^{j(f(L,T)+\frac{2\pi}{3})} \,],$$
$$B_{3,T} = [\, 1 \quad e^{j(f(L,T)+\frac{4\pi}{3})} \,]$$

In Equation 5, L is the number of precoding vectors, and f(L,T) is a phase function of the preceding vector element variable by L and T. f(L,T) can be expressed as follows.

$$f(L,T) = 2\pi T/L$$

According to Equation 5, the preceding vector of one sector is orthogonal with the precoding vector of another sector. As expressed in Equation 5, the preceding vector is dependent on the index s of the sector and the subframe in which the BCH is disposed, and is independent of the index k of the subcarrier. That is, the precoding vector is varied by the index s of the sector and the subframe in which the BCH is disposed.

The IFFT 153 performs IFFT on the frequency domain downlink frame output by the precoder 152 to generate and output a time domain downlink frame (S117).

The guard interval inserter 154 inserts a guard interval such as a cyclic prefix (CP) into the OFDM symbol of the time domain downlink frame output by the IFFT 153 to generate and output a guard interval inserted downlink frame (S119).

The RF converter 155 converts the downlink frame output by the guard interval inserter 154 into an intermediate frequency signal and then into an RF signal, amplifies the RF signal, and transmits the amplified RF signal to the mobile station 30 through the antenna 156 (S121).

A downlink frame receiving device of the mobile station 30 according to an exemplary embodiment of the present invention will now be described with reference to FIG. 14 and FIG. 15.

FIG. 14 is a block diagram for a downlink frame receiving device according to an exemplary embodiment of the present invention.

As shown in FIG. 14, the downlink frame receiving device 200 includes an antenna 201, a down converter 203, an SCH BCH band filter 205, a cell searcher 207, a guard interval remover 209, a fast Fourier transformer (FFT) 211, a channel estimator 213, a BCH demodulator 215, a BCH decoder 217, an additional channel demodulator 219, and a descrambler 221.

The mobile station 30 shares a synchronization channel scrambling code specified by the base station 20 with the base station 20.

FIG. 15 is a flowchart for a signal receiving method according to an exemplary embodiment of the present invention.

The down converter 203 converts the downlink frame received through the antenna 201 into a baseband frame, and outputs the baseband frame (S201).

The SCH BCH band filter 205 filters the SCH band signal and the BCH band signal from the baseband frame output by the down converter 203, and outputs filtered signals (S203).

The guard interval remover 209 removes the guard interval such as a CP from the SCH band signal and the BCH band signal output by the SCH BCH band filter 205 (S205).

The FFT 211 performs FFT on the guard interval removed SCH band signal and the BCH band signal to generate and output a plurality of SCH receiving symbols and a plurality of BCH receiving symbols that are transmitted by a plurality of subcarriers (S207).

The SCH receiving symbol that is output by the FFT 211 and applied to a specific receive antenna of the subcarrier k is expressed in Equation 6.

$$Y_{k,T} = \left( \sum_{s=1}^{\xi} \sum_{a=0}^{1} B_{a,s,T} H_{k,a,s,T} \right) A_{k,T} + n_k \quad \text{(Equation 6)}$$

In Equation 6, $n_k$ is additive Gaussian noise, $H_{k,a,s,T}$ is a fading channel state of a synchronization channel corresponding to the sector s, subcarrier k, transmit antenna a, and the subframe T, and $\xi$ is the number of sectors influencing the mobile station 30.

The BCH receiving symbol $R_{k,T}$ of the subcarrier k output by the FFT 211 is expressed in Equation 7.

$$R_{k,T} = \left( \sum_{s=1}^{\xi} \sum_{a=0}^{1} B_{a,s,T} H'_{k,a,s,T} \right) d_{k,T} + n'_k \quad \text{(Equation 7)}$$

In Equation 7, $n_k'$ is additive Gaussian noise, and $H'_{k,a,s,T}$ is a fading channel state of a broadcasting channel that corresponds to the sector s, subcarrier k, transmit antenna a, and subframe T.

Since the SCH symbol and the BCH symbol that are neighboring with each other on the time axis are transmitted through the same antenna and at a similar time, it is defined that the fading channel state of the synchronization channel and the fading channel state of the broadcasting channel satisfy Equation 8.

$$H_{k,a,s,T} \approx H'_{k,a,s,T} \quad \text{(Equation 8)}$$

Therefore, the mobile station 30 estimates the BCH symbol $d_{k,T}$ by estimating the fading channel state of the synchronization channel, applying the estimated fading channel state information of the synchronization channel to Equation 7, and performing a coherent demodulation process.

The cell searcher 207 identifies a cell identifier through the SCH band signal output by the SCH BCH band filter 205 to identify the k-th element $A_{k,T}$ of the SCH symbol vector (S209).

The channel estimator 213 uses the SCH receiving symbol output by the FFT 211 and the k-th element $A_{k,T}$ of the SCH symbol vector to estimate the fading channel state $H_{SCH}$ of the synchronization channel as expressed in Equation 9 (S211).

$$H_{SCH} = \left( \sum_{s=1}^{\xi} \sum_{a=0}^{1} \hat{B}_{a,s,T} \hat{H}_{k,a,s,T} \right) = \frac{Y_{k,T}}{A_{k,T}} \quad \text{(Equation 9)}$$

The BCH demodulator 215 performs a coherent soft-combining demodulation process to estimate the BCH symbol S213 as expressed in Equation 10. That is, the BCH demodulator 215 uses the BCH receiving symbol $R_{k,t}$ that corresponds to the subcarrier k output by the FFT 211 and the synchronization channel state $H_{SCH}$ estimated by the channel estimator 213 to estimate the BCH symbol $d_{k,t}$.

$$\hat{d}_{k,T} = \frac{R_{k,T} \times (H_{SCH})^*}{|H_{SCH}|^2}$$

$$= \frac{R_{k,T} \times \left( \sum_{s=1}^{\xi} \sum_{a=0}^{1} \hat{B}_{a,s,T} \hat{H}_{k,a,s,T} \right)^*}{\left| \sum_{s=1}^{\xi} \sum_{a=0}^{1} \hat{B}_{a,s,T} \hat{H}_{k,a,s,T} \right|^2} \quad \text{(Equation 10)}$$

The BCH decoder 217 performs a decoding process such as Viterbi decoding on a plurality of BCH symbols output by the BCH demodulator 215 to generate BCH data (S215).

The descrambler 221 descrambles the BCH data output by the BCH decoder 217 to restore final broadcasting channel signals specific by the base station 20 (S217).

A signal receiving device of the mobile station 30 according to another exemplary embodiment of the present invention will be described with reference to FIG. 16 and FIG. 17.

Repeated descriptions of FIG. 14 and FIG. 15 will be omitted in the descriptions of FIG. 16 and FIG. 17.

FIG. 16 is a block diagram for a signal receiving device 300 according to another exemplary embodiment of the present invention.

As shown in FIG. 16, the signal receiving device 300 includes a first antenna 301a, a second antenna 301b, a first down converter 303a, a second down converter 303b, a first SCH BCH band filter 305a, a second SCH BCH band filter 305b, a cell searcher 307, a first guard interval remover 309a, a second guard interval remover 309b, a first FFT 311a, a second FFT 311b, a channel estimator 313, a BCH demodulator 315, a BCH decoder 317, another channel demodulator 319, and a descrambler 321. Referring to FIG. 16, the signal receiving device 300 includes two antennas, and it can also include more than two antennas.

FIG. 17 is a flowchart for a signal receiving method according to another exemplary embodiment of the present invention.

The first down converter 303a and the second down converter 303b convert the downlink frames that are respectively received through the first antenna 301a and the second antenna 301b into baseband frames and then output the baseband frames (S301).

The first SCH BCH band filter 305a and the second SCH BCH band filter 305b filter the SCH band signal and the BCH band signal from the baseband frames output by the first down converter 303a and the second down converter 303b, and then output the SCH band signal and the BCH band signal (S303).

The first guard interval remover 309a and the second guard interval remover 309b respectively remove the guard interval such as the CP from the SCH band signal and the BCH band signal output by the first SCH BCH band filter 305a and the second SCH BCH band filter 305b, and then output resultant signals (S305).

The first FFT 311a and the second FFT 311b perform a fast Fourier transform (FFT) on the guard interval removed SCH band signal and the BCH band signal output by the first guard interval remover 309a and the second guard interval remover 309b to generate and output a plurality of SCH receiving symbols and a plurality of BCH receiving symbols that are transmitted by a plurality of subcarriers (S307). The SCH receiving symbol of the receive antenna 301a and the SCH receiving symbol of the receive antenna 301b in the subcarrier k are expressed in Equation 11. The BCH receiving symbol of the receive antenna 301a and the BCH receiving symbol of the receive antenna 301b in the subcarrier k are expressed in Equation 12.

$$[Y_{k,T}]_{rx\_ant=0} = \left(\sum_{s=1}^{\xi}\sum_{a=0}^{1} B_{a,s,T} \cdot [H_{k,a,s,T}]_{rx\_ant=0}\right) A_{k,T} + [n_k]_{rx\_ant=0} \quad \text{(Equation 11)}$$

$$[Y_{k,T}]_{rx\_ant=1} = \left(\sum_{s=1}^{\xi}\sum_{a=0}^{1} B_{a,s,T} \cdot [H_{k,a,s,T}]_{rx\_ant=1}\right) A_{k,T} + [n_k]_{rx\_ant=1} \quad \text{(Equation 12)}$$

$$[R_{k,T}]_{rx\_ant=0} = \left(\sum_{s=1}^{\xi}\sum_{a=0}^{1} B_{a,s,T} \cdot [H'_{k,a,s,T}]_{rx\_ant=0}\right) d_{k,T} + [n'_k]_{rx\_ant=0 rx\_ant=1}$$

$$[R_{k,T}]_{rx\_ant=1} = \left(\sum_{s=1}^{\xi}\sum_{a=0}^{1} B_{a,s,T} \cdot [H'_{k,a,s,T}]_{rx\_ant=1}\right) d_{k,T} + [n'_k]_{rx\_ant=1}$$

In Equation 11 and Equation 12, rx_ant is an index of the receive antenna.

Equation 13 will be assumed as described above.

$$[H_{k,a,s,T}]_{rx\_ant=0} \approx [H'_{k,a,s,T}]_{rx\_ant=0} \quad \text{(Equation 13)}$$

$$[H_{k,a,s,T}]_{rx\_ant=1} \approx [H'_{k,a,s,T}]_{rx\_ant=1}$$

The cell searcher 307 detects the cell identifier through the SCH band signals output by the first SCH BCH band filter 305a and the second SCH BCH band filter 305b to detect the k-th element $A_{k,T}$ of the SCH symbol vector (S309).

The channel estimator 213 uses the SCH receiving symbols output by the first FFT 311a and the second FFT 311b and the k-th element $A_{k,T}$ of the SCH symbol vector to estimate the fading channel state $[H_{SCH}]_{rx\_ant=0}$ of the synchronization channel for the antenna 301a and the fading channel state $[H_{SCH}]_{rx\_ant=1}$ of the synchronization channel for the antenna 301b as expressed in Equation 14 (S311).

$$[H_{SCH}]_{rx\_ant=0} = \left(\sum_{s=1}^{\xi}\sum_{a=0}^{1} \hat{B}_{a,s,T} \cdot [\hat{H}_{k,a,s,T}]_{rx\_ant=0}\right) \quad \text{(Equation 14)}$$

$$= \frac{[Y_{k,T}]_{rx\_ant=0}}{A_{k,T}}$$

$$[H_{SCH}]_{rx\_ant=1} = \left(\sum_{s=1}^{\xi}\sum_{a=0}^{1} \hat{B}_{a,s,T} \cdot [\hat{H}_{k,a,s,T}]_{rx\_ant=1}\right)$$

$$= \frac{[Y_{k,T}]_{rx\_ant=1}}{A_{k,T}}$$

The BCH demodulator 315 performs a coherent soft-combining demodulation process to estimate the BCH symbol as expressed in Equation 15 (S313). That is, the BCH demodulator 315 uses the BCH receiving symbol $R_{k,t}$ that corresponds to the subcarrier k output by the first FFT 311a and the synchronization channel state $H_{SCH}$ estimated by the channel estimator 313 to estimate the BCH symbol $d_{k,t}$.

$$\hat{d}_{k,T} = \frac{[R_{k,T}]_{rx\_ant=0} \times ([H_{SCH}]_{rx\_ant=0})^* + [R_{k,T}]_{rx\_ant=1} \times ([H_{SCH}]_{rx\_ant=1})^*}{|[H_{SCH}]_{rx\_ant=0}|^2 + |[H_{SCH}]_{rx\_ant=1}|^2} \quad \text{(Equation 15)}$$

$$= \frac{\frac{[R_{k,T}]_{rx\_ant=0} \times \left(\sum_{s=1}^{\xi}\sum_{a=0}^{1} \hat{B}_{a,s,T}[\hat{H}_{k,a,s,T}]_{rx\_ant=0}\right)^*}{Rx\ antenna\ 0} + \frac{[R_{k,T}]_{rx\_ant=1} \times \left(\sum_{s=1}^{\xi}\sum_{a=0}^{1} \hat{B}_{a,s,T}[\hat{H}_{k,a,s,T}]_{rx\_ant=1}\right)^*}{Rx\ antenna\ 1}}{\left|\frac{\sum_{s=1}^{\xi}\sum_{a=0}^{1} \hat{B}_{a,s,T}[\hat{H}_{k,a,s,T}]_{rx\_ant=0}}{Rx\ antenna\ 0}\right|^2 + \left|\frac{\sum_{s=1}^{\xi}\sum_{a=0}^{1} \hat{B}_{a,s,T}[\hat{H}_{k,a,s,T}]_{rx\_ant=1}}{Rx\ antenna\ 1}\right|^2}$$

The BCH decoder 317 performs a decoding process such as the Viterbi decoding on a plurality of BCH symbols output by the BCH demodulator 315 to generate the BCH data (S315).

The descrambler 321 descrambles the BCH data output by the BCH decoder 317 to restore final broadcasting channel signals specific by the base station 20 (S317).

Referring to FIG. 18 and FIG. 19, a sector transmitter according to an exemplary embodiment of the present invention will now be described.

The description repeated in FIG. 3 and FIG. 4 will be omitted in the description of FIG. 18 and FIG. 19. Also, for better comprehension and ease of description in FIG. 18 and FIG. 19, the sector transmitter 400 uses two transmit antennas, and the number of transmit antennas is changeable.

FIG. 18 is a block diagram for the sector transmitter 400 according to another exemplary embodiment of the present invention.

As shown in FIG. 18, the sector transmitter 400 transmits signals to the s-th sector, and it includes a BCH symbol generator 410, an SCH symbol generator 420, an additional channel symbol generator 430, a switch 440, and a plurality of transmitters 450. The BCH symbol generator 410 includes a channel encoder 411, an interleaver 412, a scrambler 413, and a digital modulator 414. The plurality of transmitters 450 respectively include an OFDM symbol mapper 451, a precoder 452, an inverse fast Fourier transformer (IFFT) 453, a guard interval inserter 454, an RF converter 455, and an antenna 456.

FIG. 19 is a flowchart for a sector transmitting method according to another exemplary embodiment of the present invention.

In detail, the channel encoder 411 performs a channel coding process such as turbo coding or convolution coding on the BCH data that correspond to the BCH message packet to generate and output channel-encoded BCH data (S401).

The interleaver 412 changes the order of the channel encoded BCH data output by the channel encoder 411 to generate and output interleaved BCH data (S403).

The scrambler 413 scrambles the interleaved BCH data output by the interleaver 412 to generate and output scrambled BCH data (S405).

The digital modulator 414 performs a digital modulation process such as the binary phase shift key (BPSK) or quadrature amplitude modulation (QAM) on the scrambled BCH data output by the scrambler 413 to generate and output a plurality of BCH symbols (S407).

The SCH symbol generator 420 generates and outputs a plurality of SCH symbols (S408). When the number of SCH symbols included by the subframe having a SCH is N, the SCH symbol generator 420 generates and outputs the SCH symbol vector of Equation 16, for the sector s.

$$A_T = [A_{0,0,T} A_{1,1,T}, \ldots, A_{2i,0,T} A_{2i+1,1,T} \ldots, A_{N-1,0,T} (\text{or } A_{N-1,1,T})] \quad \text{(Equation 16)}$$

In Equation 16, $A_{j,a,T}$ is an SCH symbol that is transmitted from the antenna a from the T-th to j-th subcarriers from among the symbol sections in which the SCH is disposed. That is, in Equation 16, the SCH symbols that are transmitted through the even-numbered subcarriers are transmitted through the antenna 0, and the SCH symbols that are transmitted through the odd-numbered subcarriers are transmitted through the antenna 1. Application of the frequency switched transmit diversity (FSTD) on the SCH is different from this. The SCH symbol vector $A_T$ is variable by the index T of the symbol section.

The switch 440 divides the BCH symbol output by the BCH symbol generator 410 to output divided symbols to a plurality of transmitters 450, and divides the SCH symbol output by the SCH symbol generator 420 to output divided symbols to a plurality of transmitters 450 (S409). That is, the switch 440 performs a switching process for applying the same FSTD to the BCH symbol and the SCH symbol.

The additional channel symbol generator 430 generates a plurality of additional channel symbols to a plurality of transmitters 450 (S411).

The transmitters 450 use a plurality of BCH symbols output by the BCH symbol generator 410, a plurality of SCH symbols output by the SCH symbol generator 420, and a plurality of additional channel symbols output by the additional channel symbol generator 430 to generate a plurality of time domain downlink frames that correspond to a plurality of antennas 456, and then output them to the s-th sector through a plurality of antennas 456.

In detail, a plurality of OFDM symbol mappers 451 respectively map a plurality of BCH symbols, a plurality of SCH symbols, and a plurality of additional channel symbols output by the switch 440 on a plurality of subcarriers and a plurality of symbol sections to generate a plurality of frequency domain downlink frames that respectively correspond to the antennas 456 (S413). In this instance, the OFDM symbol mappers 451 map a plurality of BCH symbols and a plurality of SCH symbols to a plurality of different subcarriers. The OFDM symbol mappers 451 respectively map the same subcarrier on the neighboring BCH symbol and the SCH symbol.

A plurality of downlink frames for a plurality of antennas shown in FIG. 20 are generated by the switch 440 and a plurality of OFDM symbol mappers 451. FIG. 20 shows a downlink frame in which the same FSTD is applied to the SCH and the BCH according to an exemplary embodiment of the present invention.

A plurality of precoders 452 respectively apply a preceding vector to the SCH symbols and the BCH symbols neighboring with each other in the corresponding downlink frame as expressed in Equation 17 (S415).

$$C_{k,a,s,T} = \begin{cases} F_{0,s,T} d_{k,T} & (k \text{ is even number}) \\ F_{1,s,T} d_{k,T} & (k \text{ is odd number}) \end{cases} \quad \text{(Equation 17)}$$

In Equation 17, k is an index of a subcarrier for transmitting the BCH symbol, a is an index of an antenna, the symbol $d_{k,T}$ is a BCH symbol transmitted from the T-th subcarrier to the k-th subcarrier from among the symbol sections in which the BCH is disposed, and $F_{a,s,T}$ is a preceding weight that is the a-th element of the preceding vector $F_{s,T}$ that corresponds to the sector s and the symbol section T.

An example of the precoding vector $F_{s,T}$ is expressed in Equation 18.

$$F_{s,T} = [F_{0,s,T} \quad F_{1,s,T}] \quad \text{(Equation 18)}$$
$$F_{1,T} = [1 \quad e^{j(f(L,T)+0)}],$$
$$F_{2,T} = [1 \quad e^{j(f(L,T)+\frac{2\pi}{3})}],$$
$$F_{3,T} = [1 \quad e^{j(f(L,T)+\frac{4\pi}{3})}]$$

In Equation 18, L is the number of precoding vectors. The preceding vector of one sector is orthogonal with the preceding vector of another sector according to Equation 18. It is desirable for a plurality of precoding vectors to be orthogonal with each other according to the change of T. As expressed in Equation 18, the precoding vector is dependent on the index s of the sector and the subframe in which the BCH is disposed, and is independent of the index of the subcarrier. That is, the preceding vector is variable by the subframe in which the index s of the sector and the BCH are positioned.

The IFFT 453 performs an IFFT on the frequency domain downlink frame output by the precoder 452 to generate and output a time domain downlink frame (S417).

The guard interval inserter 454 inserts a guard interval such as a CP into the OFDM symbol of the time domain downlink frame output by the IFFT 453 to generate and output a guard interval inserted downlink frame (S419).

The RF converter 455 converts the downlink frame output by the guard interval inserter 454 into an intermediate frequency signal and then into an RF signal, amplifies the RF signal, and transmits the amplified RF signal to the mobile station 30 through the antenna 456 (S421).

A downlink frame receiving device of the mobile station 30 according to an exemplary embodiment of the present invention will be described with reference to FIG. 21 and FIG. 22.

Repeated descriptions of FIG. 14 and FIG. 15 will be omitted in the description of FIG. 21 and FIG. 22.

FIG. 21 is a block diagram for a downlink frame receiving device 500 according to another exemplary embodiment of the present invention.

As shown in FIG. 21, the downlink frame receiving device 500 includes an antenna 501, a down converter 503, an SCH BCH band filter 505, a cell searcher 507, a guard interval remover 509, an FFT 511, a channel estimator 513, a BCH demodulator 515, a BCH decoder 517, an additional channel demodulator 519, and a descrambler 521.

The mobile station 30 shares the synchronization channel scrambling code specific by the base station 20 with the base station 20.

FIG. 22 is a flowchart for a signal receiving method according to another exemplary embodiment of the present invention.

The down converter 503 converts the downlink frame received through the antenna 501 into a baseband frame and outputs the baseband frame (S501).

The SCH BCH band filter 505 filters the SCH band signal and the BCH band signal from the baseband frame output by the down converter 503, and then outputs resultant signals (S503).

The guard interval remover 509 removes a guard interval such as the CP from the SCH band signal and the BCH band signal output by the SCH BCH band filter 505 (S505).

The FFT 511 performs an FFT on the guard interval removed SCH band signal and the BCH band signal to generate and output a plurality of SCH receiving symbols and a plurality of BCH receiving symbols transmitted by a plurality of subcarriers (S507).

The SCH receiving symbol input to a specific receive antenna of the subcarrier k output by the FFT 511 is expressed in Equation 19.

$$\Upsilon_{k,T} = \begin{cases} \left(\sum_{s=1}^{\xi} F_{0,s,T} H_{k,0,s,T}\right) A_{k,0,T} + n_k, & (k \text{ is even number}) \\ \left(\sum_{s=1}^{\xi} F_{1,s,T} H_{k,1,s,T}\right) A_{k,1,T} + n_k, & (k \text{ is odd number}) \end{cases} \quad \text{(Equation 19)}$$

In Equation 19, $n_k$ is additive Gaussian noise, $H_{k,a,s,T}$ is a fading channel state of a synchronization channel that corresponds to the sector s, subcarrier k, transmit antenna a, and subframe T, and $\xi$ is a sector influencing the mobile station 30.

The BCH receiving symbol $R_{k,T}$ of the subcarrier k output by the FFT 511 is expressed in Equation 20.

$$R_{k,T} = \begin{cases} \left(\sum_{s=1}^{\xi} F_{0,s,T} H'_{k,0,s,T}\right) d_{k,T} + n'_k, & (k \text{ is even number}) \\ \left(\sum_{s=1}^{\xi} F_{1,s,T} H'_{k,1,s,T}\right) d_{k,T} + n'_k, & (k \text{ is odd number}) \end{cases} \quad \text{(Equation 20)}$$

In Equation 20, $n_k'$ is additive Gaussian noise, and $H'_{k,a,s,T}$ is a fading channel state of a broadcasting channel that corresponds to the sector s, subcarrier k, transmit antenna a, and subframe T.

Since the SCH symbol and the BCH symbol that are neighboring with each other on the time axis are transmitted through the same antenna and at a similar time, the fading channel state of the synchronization channel and the fading channel state of the broadcasting channel are assumed to satisfy Equation 21.

$$H_{k,a,s,T} \approx H'_{k,a,s,T} \quad \text{(Equation 21)}$$

Therefore, the mobile station 30 estimates the fading channel state of the synchronization channel, and estimates the BCH symbol $d_{k,T}$ by applying the estimated fading channel state information of the synchronization channel to Equation 20 and performing a coherent demodulation process.

The cell searcher 507 detects the cell identifier through the SCH band signal output by the SCH BCH band filter 505 to detect the k-th element $A_{k,T}$ of the SCH symbol vector (S509).

The channel estimator 513 uses the SCH receiving symbol output by the FFT 511 and the k-th element $A_{k,T}$ of the SCH symbol vector to estimate the fading channel state $H_{SCH}$ of the synchronization channel as expressed in Equation 22 (S511).

$$H_{SCH} = \left(\sum_{s=1}^{\xi} \sum_{a=0}^{1} \hat{F}_{a,s,T} \hat{H}_{k,a,s,T}\right) = \frac{\Upsilon_{k,T}}{A_{k,a,T}} \quad \text{(Equation 22)}$$

The BCH demodulator 515 performs a coherent soft-combining demodulation process to estimate the BCH symbol (S513) as expressed in Equation 23. That is, the BCH demodulator 515 uses the BCH receiving symbol $R_{k,t}$ corresponding to the subcarrier k output by the Fourier transform unit 511 and the synchronization channel state $H_{SCH}$ estimated by the channel estimator 513 to estimate the BCH symbol $d_{k,t}$.

$$\hat{d}_{k,T} = \frac{R_{k,T} \times (H_{SCH})^*}{|H_{SCH}|^2} \quad \text{(Equation 23)}$$

$$= \frac{R_{k,T} \times \left(\sum_{s=1}^{\xi} \sum_{a=0}^{1} \hat{F}_{a,s,T} \hat{H}_{k,a,s,T}\right)^*}{\left|\sum_{s=1}^{\xi} \sum_{a=0}^{1} \hat{F}_{a,s,T} \hat{H}_{k,a,s,T}\right|^2}$$

The BCH decoder 517 performs a decoding process such as Viterbi decoding on a plurality of BCH symbols output by the BCH demodulator 515 to generate BCH data (S515).

The descrambler 521 descrambles the BCH data output by the BCH decoder 517 to restore final broadcasting channel signals specific by the base station 20 (S517).

Referring to FIG. 23 and FIG. 24, a signal receiving device of the mobile station 30 according to another exemplary embodiment of the present invention will now be described.

The description repeated in FIG. 16 and FIG. 17 will be omitted in the description with reference to FIG. 23 and FIG. 24.

FIG. 23 is a block diagram for a signal receiving device 600 according to another exemplary embodiment of the present invention.

As shown in FIG. 23, the signal receiving device 600 includes a first antenna 601a, a second antenna 601b, a first down converter 603a, a second down converter 603b, a first SCH BCH band filter 605a, a second SCH BCH band filter 605b, a cell searcher 607, a first guard interval remover 609a, a second guard interval remover 609b, a first FFT 611a, a second FFT 611b, a channel estimator 613, a BCH demodulator 615, a BCH decoder 617, an additional channel demodulator 619, and a descrambler 621. Referring to FIG. 23, the signal receiving device 600 includes two antennas, and it can also include more than two antennas.

FIG. 24 is a flowchart for a signal receiving method according to another exemplary embodiment of the present invention.

The first down converter 603a and the second down converter 603b respectively convert the downlink frames that are received through the first antenna 601a and the second antenna 601b into baseband frames, and then output the baseband frames (S601).

The first SCH BCH band filter 605a and the second SCH BCH band filter 605b respectively filter the SCH band signal and the BCH band signal from the baseband frames output by the first down converter 603a and the second down converter 603b (S603).

The first guard interval remover 609a and the second guard interval remover 609b respectively remove the guard interval such as the CP from the SCH band signal and the BCH band signal output by the first SCH BCH band filter 605a and the second SCH BCH band filter 605b (S605).

The first FFT 611a and the second FFT 611b perform an FFT on the guard interval removed SCH band signal and the BCH band signal output by the first guard interval remover 609a and the second guard interval remover 609b to generate and output a plurality of SCH receiving symbols and a plurality of BCH receiving symbols transmitted by a plurality of subcarriers (S607). The SCH receiving symbol of the receive antenna 601a and the SCH receiving symbol of the receive antenna 601b in the subcarrier k are expressed in Equation 24. The BCH receiving symbol of the receive antenna 601a and the BCH receiving symbol of the receive antenna 601b in the subcarrier k are expressed in Equation 25.

$$[\Upsilon_{k,T}]_{rx\_ant=0} = \qquad \text{(Equation 24)}$$

$$\begin{cases} \left(\sum_{s=1}^{\xi}\sum_{a=0}^{1} F_{0,s,T}\cdot[H_{k,0,s,T}]_{rx\_ant=0}\right)A_{k,0,T} + [n_k]_{rx\_ant=0}, & (k \text{ is even}) \\ \left(\sum_{s=1}^{\xi}\sum_{a=0}^{1} F_{1,s,T}\cdot[H_{k,1,s,T}]_{rx\_ant=0}\right)A_{k,1,T} + [n_k]_{rx\_ant=0}, & (k \text{ is odd}) \end{cases}$$

$$[\Upsilon_{k,T}]_{rx\_ant=1} =$$

$$\begin{cases} \left(\sum_{s=1}^{\xi}\sum_{a=0}^{1} F_{0,s,T}\cdot[H_{k,0,s,T}]_{rx\_ant=1}\right)A_{k,0,T} + [n_k]_{rx\_ant=1}, & (k \text{ is even}) \\ \left(\sum_{s=1}^{\xi}\sum_{a=0}^{1} F_{1,s,T}\cdot[H_{k,1,s,T}]_{rx\_ant=1}\right)A_{k,1,T} + [n_k]_{rx\_ant=1}, & (k \text{ is odd}) \end{cases}$$

$$[R_{k,T}]_{rx\_ant=0} = \qquad \text{(Equation 25)}$$

$$\begin{cases} \left(\sum_{s=1}^{\xi} F_{0,s,T}\cdot[H'_{k,0,s,T}]_{rx\_ant=0}\right)d_{k,T} + [n'_k]_{rx\_ant=0}, & (k \text{ is even}) \\ \left(\sum_{s=1}^{\xi} F_{1,s,T}\cdot[H'_{k,1,s,T}]_{rx\_ant=0}\right)d_{k,T} + [n'_k]_{rx\_ant=0}, & (k \text{ is odd}) \end{cases}$$

$$[R_{k,T}]_{rx\_ant=1} =$$

$$\begin{cases} \left(\sum_{s=1}^{\xi} F_{0,s,T}\cdot[H'_{k,0,s,T}]_{rx\_ant=1}\right)d_{k,T} + [n'_k]_{rx\_ant=1}, & (k \text{ is even}) \\ \left(\sum_{s=1}^{\xi} F_{1,s,T}\cdot[H'_{k,1,s,T}]_{rx\_ant=1}\right)d_{k,T} + [n'_k]_{rx\_ant=1}, & (k \text{ is odd}) \end{cases}$$

In Equation 24 and Equation 25, rx_ant is an index of the receive antenna.

Equation 26 can be assumed as follows.

$$[H_{k,a,s,T}]_{rx\_ant=0} \approx [H'_{k,a,s,T}]_{rx\_ant=0}$$

$$[H_{k,a,s,T}]_{rx\_ant=1} \approx [H'_{k,a,s,T}]_{rx\_ant=1} \qquad \text{(Equation 26)}$$

The cell searcher 607 detects the cell identifier through the SCH band signals output by the first SCH BCH band filter 605a and the second SCH BCH band filter 605b to detect the k-th element $A_{k,T}$ of the SCH symbol vector (S609).

The channel estimator 613 uses the SCH receiving symbol output by the first FFT 611a and the second FFT 611b and the k-th element $A_{k,a,T}$ of the SCH symbol vector to estimate the fading channel state $[H_{SCH}]_{rx\_ant=0}$ of the synchronization channel for the antenna 601a and the fading channel state $[H_{SCH}]_{rx\_ant=1}$ of the synchronization channel for the antenna 601b as expressed in Equation 27 (S611).

$$[H_{SCH}]_{rx\_ant=0} = \left(\sum_{s=1}^{\xi}\sum_{a=0}^{1} \hat{F}_{a,s,T}\cdot[\hat{H}_{k,a,s,T}]_{rx\_ant=0}\right) \qquad \text{(Equation 27)}$$

$$= \frac{[\Upsilon_{k,T}]_{rx\_ant=0}}{A_{k,a,T}}$$

$$[H_{SCH}]_{rx\_ant=1} = \left(\sum_{s=1}^{\xi}\sum_{a=0}^{1} \hat{F}_{a,s,T}\cdot[\hat{H}_{k,a,s,T}]_{rx\_ant=1}\right)$$

$$= \frac{[\Upsilon_{k,T}]_{rx\_ant=1}}{A_{k,a,T}}$$

The BCH demodulator 615 performs a coherent soft-combining demodulation process to estimate the BCH symbol as expressed in Equation 28 (S613). That is, the BCH demodulator 615 uses the BCH receiving symbol $R_{k,t}$ corresponding to the subcarrier k output by the first FFT 611a and the synchronization channel state $H_{SCH}$ estimated by the channel estimator 613 to estimate the BCH symbol $d_{k,t}$.

$$\hat{d}_{k,T} = \frac{[R_{k,T}]_{rx\_ant=0}\times([H_{SCH}]_{rx\_ant=0})^* + [R_{k,T}]_{rx\_ant=1}\times([H_{SCH}]_{rx\_ant=1})^*}{|[H_{SCH}]_{rx\_ant=0}|^2 + |[H_{SCH}]_{rx\_ant=1}|^2} \qquad \text{(Equation 28)}$$

$$= \frac{\underbrace{[R_{k,T}]_{rx\_ant=0}\times\left(\sum_{s=1}^{\xi}\sum_{a=0}^{1}\hat{F}_{a,s,T}[\hat{H}_{k,a,s,T}]_{rx\_ant=0}\right)^*}_{Rx\ antenna\ 0} + \underbrace{[R_{k,T}]_{rx\_ant=1}\times\left(\sum_{s=1}^{\xi}\sum_{a=0}^{1}\hat{F}_{a,s,T}[\hat{H}_{k,a,s,T}]_{rx\_ant=1}\right)^*}_{Rx\ antenna\ 1}}{\underbrace{\left|\sum_{s=1}^{\xi}\sum_{a=0}^{1}\hat{F}_{a,s,T}[\hat{H}_{k,a,s,T}]_{rx\_ant=0}\right|^2}_{Rx\ antenna\ 0} + \underbrace{\left|\sum_{s=1}^{\xi}\sum_{a=0}^{1}\hat{F}_{a,s,T}[\hat{H}_{k,a,s,T}]_{rx\_ant=1}\right|^2}_{Rx\ antenna\ 1}}$$

The BCH decoder 617 performs a decoding process such as the Viterbi decoding on a plurality of BCH symbols output by the BCH demodulator 615 to generate BCH data (S615).

The descrambler 621 descrambles the BCH data output by the BCH decoder 617 to restore final broadcasting channel signals specific by the base station 20 (S617).

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for generating a downlink frame, comprising:
arranging a plurality of synchronization channel symbols and a plurality of broadcasting channel symbols to neighbor each other on a time axis; and
applying a precoding vector to the synchronization channel symbols and the broadcasting channel symbols to generate a plurality of downlink frames respectively corresponding to a plurality of antennas, wherein
the precoding vector is variable by a sector for transmitting the downlink frames, wherein
the precoding vector of one sector is orthogonal with the precoding vector of another sector.

2. A method for generating a downlink frame, comprising:
arranging a plurality of synchronization channel symbols and a plurality of broadcasting channel symbols to neighbor each other on a time axis; and
applying a precoding vector to the synchronization channel symbols and the broadcasting channel symbols to generate a plurality of downlink frames respectively corresponding to a plurality of antennas, wherein
the precoding vector is variable by a sector for transmitting the downlink frames, wherein
the precoding vector is further variable by a subframe in which the broadcasting channel symbols are positioned.

3. The method of claim 2, wherein
the precoding vector is independent of an index of a subcarrier.

4. The method of claim 3, wherein
the step of arranging includes arranging the synchronization channel symbols and the broadcasting channel symbols in a common bandwidth of a system.

5. A method for transmitting a downlink frame for respectively transmitting a plurality of downlink frames including a first downlink frame and a second downlink frame through a plurality of antennas including a first antenna and a second antenna, the method comprising:
arranging a first symbol from among a plurality of synchronization channel symbols and a nulling symbol to a first subcarrier and a second subcarrier of a first symbol section of the first downlink frame;
arranging a second symbol from among a plurality of broadcasting channel symbols and a nulling symbol to a third subcarrier and a fourth subcarrier of a second symbol section of the first downlink frame;
arranging a nulling symbol and a third symbol from among the synchronization channel symbols to a fifth subcarrier and a sixth subcarrier of a third symbol section of the second downlink frame;
arranging a nulling symbol and a fourth symbol from among the broadcasting channel symbols to a seventh subcarrier and an eighth subcarrier of a fourth symbol section of the second downlink frame;
applying a first precoding weight corresponding to the first antenna to the first symbol and the second symbol; and
applying a second precoding weight corresponding to the second antenna to the third symbol and the fourth symbol, wherein
the first symbol section and the third symbol section are the same sections, the second symbol section and the fourth symbol section are the same sections, the second symbol section neighbors the first symbol section, and the fourth symbol section neighbors the second symbol section on a time axis,
the first subcarrier, the third subcarrier, the fifth subcarrier, and the seventh subcarrier are the same, and
the second subcarrier, the fourth subcarrier, the sixth subcarrier, and the eighth subcarrier are the same.

6. The method of claim 5, wherein
the first precoding weight and the second precoding weight are elements of a precoding vector, and
the precoding vector is variable by a sector for transmitting the downlink frames.

7. The method of claim 6, wherein
the precoding vector is further variable by a subframe in which the first symbol section is positioned.

8. The method of claim 7, wherein
the precoding vector is independent of an index of a subcarrier.

9. The method of claim 8, wherein
the synchronization channel symbols and the broadcasting channel symbols are arranged in the common bandwidth of a system.

* * * * *